US011486465B2

(12) United States Patent
Campbell

(10) Patent No.: US 11,486,465 B2
(45) Date of Patent: Nov. 1, 2022

(54) INSPECTABLE SYNTHETIC TENSILE MEMBER ASSEMBLY

(71) Applicant: Richard V. Campbell, Havana, FL (US)

(72) Inventor: Richard V. Campbell, Havana, FL (US)

(73) Assignee: Bright Technologies, LLC, Havana, FL (US)

( * ) Notice: Subject to any disclaimer, the term of this patent is extended or adjusted under 35 U.S.C. 154(b) by 0 days.

(21) Appl. No.: 17/752,048

(22) Filed: May 24, 2022

(65) Prior Publication Data

US 2022/0282770 A1    Sep. 8, 2022

Related U.S. Application Data

(60) Continuation-in-part of application No. 17/497,216, filed on Oct. 8, 2021, and a continuation-in-part of application No. 16/747,580, filed on Jan. 21, 2020, said application No. 17/497,216 is a division of application No. 16/236,945, filed on Dec. 31, 2018, now Pat. No. 11,221,055, which is a continuation of application No. 13/894,463, filed on May 15, 2013, now Pat. No. 10,167,928.

(60) Provisional application No. 62/881,213, filed on Jul. 31, 2019.

(51) Int. Cl.
    *F16G 11/02* (2006.01)

(52) U.S. Cl.
    CPC ....... *F16G 11/025* (2013.01); *Y10T 29/49817* (2015.01)

(58) Field of Classification Search
    None
    See application file for complete search history.

(56) References Cited

U.S. PATENT DOCUMENTS

2005/0226584 A1* 10/2005 Williams ................. D04C 1/02
                                                              385/130

* cited by examiner

*Primary Examiner* — Raul J Rios Russo
*Assistant Examiner* — Carl F. R. Tchatchouang
(74) *Attorney, Agent, or Firm* — J. Wiley Horton

(57) ABSTRACT

A protected synthetic tensile member assembly including one or more fixed terminations used to transmit a tensile load from the tensile member to an external component. The tensile member includes access for inspection of its constituent fibers in at least one selected inspection region. The region is selected on the basis of the area of interest to the tensile member's use—such as the area of greatest stress concentration, the area of greatest abrasion, or an area of likely strand-to strand or overall cable translation. A removable cover is provided for the inspection region. A user may selectively remove this cover in order to gain access to the inspection region.

20 Claims, 30 Drawing Sheets

INSPECTABLE SYNTHETIC TENSILE MEMBER ASSEMBLY

CROSS-REFERENCES TO RELATED APPLICATIONS

This non-provisional patent application is a continuation-in-part of U.S. patent application Ser. Nos. 17/497,216 and 16/747,580. The parent applications listed the same inventor.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of load-carrying tensile members. More specifically, the invention comprises a synthetic tensile member assembly designed to permit easy inspection of defined regions in which high stress, high wear, strand translation, overall cable translation, or other significant conditions are expected to occur.

2. Description of the Related Art

Prior art tensile members are often made of steel wire. The diameter of each wire is significantly less than the diameter of the tensile member as a whole. The wires are formed into a cohesive unit by varying known processes, with helical wrapping being one good example. In order for the tensile member to transmit a tensile load, one or more terminations must be added. The word "termination" shall mean an assembly on a portion of the tensile member that allows a load-transmitting device to be attached to the tensile member. Such terminations are most often attached to the ends of a tensile member but they may also be placed on an intermediate point in some cases.

A termination is most often created by attaching a rigid loading fixture to the end of a tensile member in order to provide a consistent and reliable interface between the often-flexible components of the tensile member and external components. The loading fixture may be one solid piece or may be an assembly of two or more pieces. A simple prior art example is a closed Spelter socket. A Spelter socket is typically a metal casting or forging that includes a loading eye and an expanding cavity. The steel wires proximate the end of the tensile member are placed within the cavity and then splayed apart. The cavity is then filled with a potting compound. The term "potting compound" means any composition that transitions from a liquid to a solid over time. As one example, the potting compound may be lead. Molten lead is poured into the cavity (with the splayed wires present) and the lead then cools and solidifies. As a second example, the potting compound may be a two-part epoxy. The two parts are mixed together and then placed in the cavity. The two parts then cross-link and solidify.

Once the potting compound solidifies, the end of the steel wire tensile member is locked to the Spelter socket and a termination is thereby created. In this example, the "termination" includes the Spelter socket (including the loading eye and cavity), the length of strands potted into the cavity, and the potting compound that has solidified in the cavity. The loading eye may be attached to some external object and the tensile member may then be used to transmit tension. Spelter sockets are made with many different types of loading features, including a tang or clevis with a transverse hole.

In some examples, the rigid loading fixture may be split into two pieces. The first piece contains the cavity used for potting. This piece is usually called an "anchor." The second piece attaches to the anchor and includes a feature for transmitting a load—such as a loading eye. As an example, the anchor might include an external thread. The loading eye would then include an internal thread designed to engage the external thread on the anchor.

As those skilled in the art will know, many other types of terminations exist. As another example, a wire tensile member can be wrapped around a metal thimble and woven or clamped back on itself. The middle of the thimble then forms an "eye" through which a pin may be passed to secure the termination to an external object. In still another example, the tensile member may be woven around a hollow transverse tube. The hollow tube then receives a transverse pin. In all these examples, the termination provides a rigid and consistent load-transference point for the tensile member. In other words, the point at which a load is to be transferred to the tensile member is clearly defined. Further, the fibers that are actually connected to the load-transference point are held in a consistently defined state (They are locked into the termination in a consistent and repeatable way). Such a termination is defined as a "fixed termination." This is to be contrasted with some other prior art tensile members such as slings that are made of a continuous loop of material. Such continuous-loop slings may be loaded at an infinite number of points (such as by passing a given point of the sling around a transverse pin). The present invention applies to fixed terminations.

Tensile members are often used in "critical" applications where the failure of the tensile member could have catastrophic results. One good example would be a tensile member used as a "stay" in a crane. The portions of the tensile member lying outside the terminations are often subjected to abrasion forces, cutting forces, ultraviolet radiation, corrosion, debris infiltration, and other degrading phenomena. A tensile member will of course not remain in service forever. It must be inspected and periodically replaced. A long-established inspection regimen exists for steel wire tensile members used in critical applications. The outer wires of each tensile member bundle are visually accessible.

One well-known criterion simply counts the number of broken wires that are visible on a tensile member's exterior and uses this as a pass/fail criterion. While somewhat crude, this approach has been found to be effective for the prior art steel wire tensile members.

It is now known to replace the steel wires in a prior art tensile member with high-strength synthetic fibers. Examples include KEVLAR, VECTRAN, DYNEEMA, TECHNORA, SPECTRA, POLYESTER, NYLON, GLASS, CARBON, and ZYLON. The individual components of a steel tensile member are most commonly referred to as "wires" while the individual components of a tensile member made of synthetic materials are most commonly referred to as "fibers" or "filaments." For consistency in this disclosure, the term "fibers" will be used for the synthetic components.

Pound-for-pound, synthetic tensile members have the potential to be much stronger than steel tensile members. They offer other advantages as well—such as corrosion resistance and easier handling. However, some characteristics of synthetic fibers are less desirable. Synthetic fibers have a very small diameter, on the order of a human hair, making it very difficult to inspect large sections. Synthetic fibers are also much softer than steel, making them more prone to snag and tear. They are also more susceptible to heat damage, debris infiltration, abrasion damage, ultraviolet degradation, and cutting damage. Thus, in many applications it is desirable to protect any exposed synthetic fibers in a tough external jacket.

The term "jacket" should be understood to include any type of protective covering for a collection of synthetic fibers. It most commonly refers to a covering for a bundle of strands passing between two terminations, but it may also encompass some or all of the terminations themselves. A jacket may be applied via an extrusion process, such as extruding a NYLON plastic jacket over a core of synthetic fibers. A jacket may also be added by dipping, spraying, wrapping, or braiding. A jacket may include any material or combination of materials.

The term jacket is by no means limited to the particular method of application. Any material which protects the synthetic fibers could be considered a jacket. Because many tensile members are flexible, it may be desirable for the jacket material to be flexible. A flexible cable wrapped around a winch drum is one example.

However, other tensile members need not be flexible at all. For instance, a stay used in a crane often remains in one position at all times. It simply transmits a tensile load between two points. In that instance, the jacket may be a piece of hollow steel tubing. A core of synthetic strands is passed through the hollow steel tubing and secured to a termination on each end. When tension is removed from such an assembly, it does not go slack because of the relative stiffness of the jacket material. However, as the primary purpose of the assembly is still to carry tension, it is properly referred to as a "tensile member."

FIGS. 1 and 2 show the prior art approach of encasing the synthetic fibers in a surrounding jacket. In FIG. 1, termination 22 is created by attaching anchor 18 to tensile member 20. FIG. 2 shows a section view through the completed assembly. Fibers 26 are placed in expanding passage 30 through anchor 18. They are then potted in place to create potted region 32. Attachment fixture 36 is connected to anchor 18 using threaded coupling 34.

Jacket 24 is provided over the exterior of synthetic fibers 26. It preferably extends a short distance into anchor 18. In the embodiment shown, the jacket is received within jacket receiver 28. Thus, no portion of the synthetic fibers is exposed to the outside world.

Jacket 24 is preferably made of a tough material able to withstand normal use within the intended environment. A common example of a jacket is an extruded layer of NYLON or HDPE covering the exterior of the synthetic fiber core. The jacket and the rigid terminations in this example are able to withstand abrasive forces, cutting forces, and ultraviolet radiation. In more extreme examples, the jacket may include a woven metal reinforcement layer. Of course, as explained previously, the jacket may even be a solid metal tube. In any event, a primary objective of the jacket is to ameliorate most of the durability problems associated with using synthetic fibers.

However, the reader will also appreciate that the jacket interferes with the vital inspection function. In the example of FIGS. 1 and 2, there is no way for an inspector to look at the fibers contained within the jacket. This lack of "inspectability" has become a deterrent to the use of protected synthetic tensile members in critical applications.

In fact, the prior art approach has often been to use the synthetic fibers in an unprotected (unjacketed) state. The relatively delicate fibers are left exposed to the elements so that they can be inspected. This exposure introduces concerns regarding predictability and overall reliability. Such tensile members may break down gradually due to frictional wear, ultraviolet degradation, debris infiltration, chemical infiltration, etc. For example, when a tensile member made of synthetic fibers is dragged around the deck of a vessel, some fibers will be damaged. However, this wear is not objectively quantifiable. The only way to determine the strength reduction is to actually test the cable to destruction.

One prior art approach has been to weave a continuous "sling" of synthetic fibers. The sling is then surrounded by a loose bag that provides some degree of protection. However, the sling typically has no fixed and rigid loading points (It has no fixed terminations). Such slings are intended to be passed around particular objects (such as a pin having a minimum diameter) or connected to general rigging hardware. However, a user encountering such as sling has no idea whether it has been used incorrectly in the past. The flexible bag encasing the core fibers may in fact be concealing many broken or damaged fibers. Inconsistencies in the hardware the sling is connected to create many potential unknowns. The lack of environmental control creates issues with fiber inspection due to the fact that there is no defined region of interest.

While prior art tension members using synthetic fibers have many known performance advantages, they do not tend to wear in a controlled and predictable fashion when exposed to the environment in which they are used. They ideally need to be protected from environmental elements. However, they also need to be "inspectable" to gain and retain the confidence of the community that uses them.

A user needs visual access to portions of the tensile strength member in order to inspect for filament breakage, frictional wear, plastic deformation, and the like. Other phenomena require visual inspection as well. Most larger tensile strength members are made of smaller constituent strands that are assembled into a unified whole. As one example, a 12-strand cable is made from 12 individual smaller cables that are assembled as 9 outer strands wrapped around a core of 3 strands. Each of these strands is in itself made of many individual synthetic filaments or fibers (up to millions of such filaments or fibers). Longitudinal translation of a single strand, multiple strands, or all strands can indicate a serious problem for a strength member. An exemplary indication is the longitudinal translation of all the strands with respect to a fixed point—such as an anchor exit. This often indicates a problem inside the anchor itself. For a termination created by potting one or more strands into an expanding cavity, the longitudinal translation can indicate crushing of the potted region. For a termination created by splicing one or more strands around one or more transverse pins, the longitudinal translation can indicate slippage of the spliced section, deformation of the transverse pins, or some other phenomenon. Thus, a visual indicator lying outside the anchor alerts an inspector to an issue occurring inside the anchor.

The present invention solves the problem of inspection and monitoring by providing an inspection region in a protected synthetic tensile member assembly having controlled anchor points. The inspection region selectively provides access to critical areas so that an inspector may view the fibers and/or the strands in these critical areas.

BRIEF SUMMARY OF THE PRESENT INVENTION

The present invention comprises a protected synthetic tensile member assembly including one or more fixed terminations used to transmit a tensile load from the tensile member to an external component. The tensile member includes access for inspection of its constituent fibers and/or strands in at least one selected inspection region. The region is selected on the basis of the area of interest to the tensile member's use—such as the area of greatest stress concentration, the area of greatest abrasion, or an area of likely strand or cable longitudinal translation ("slippage"). A removable cover is provided for the inspection region. A user may selectively remove this cover in order to gain access to the inspection region.

Figure 1:
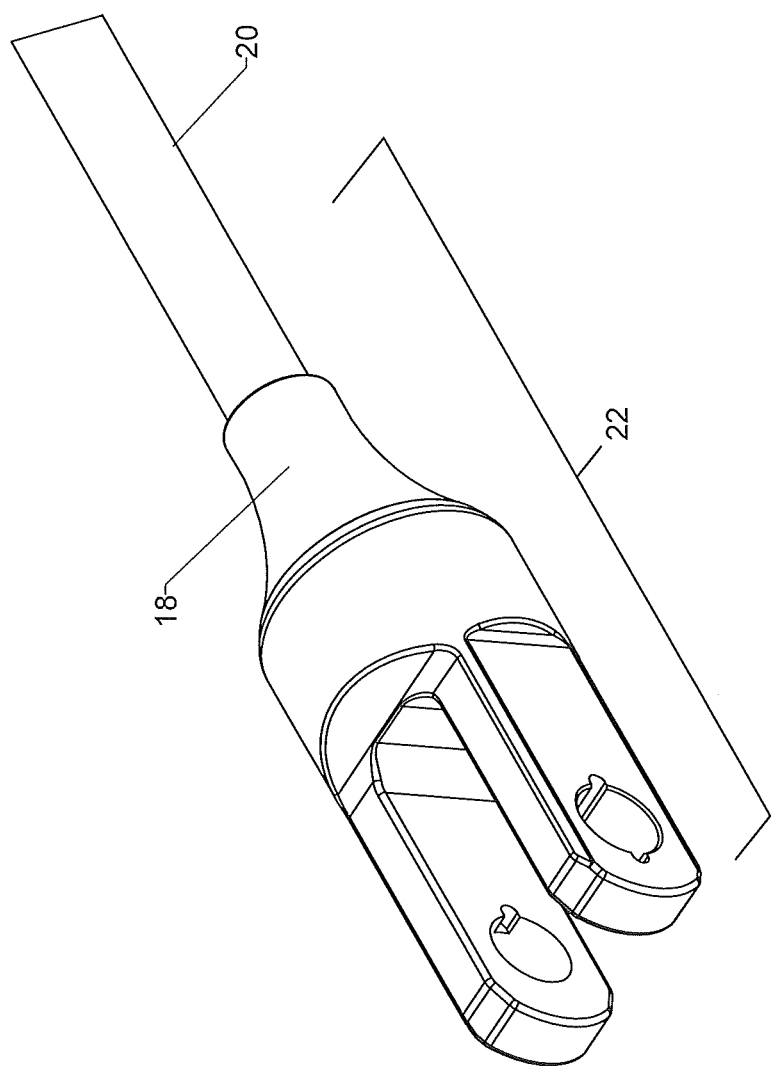
FIG. 1 is a perspective view, showing a prior art tensile member.
Figure 2:
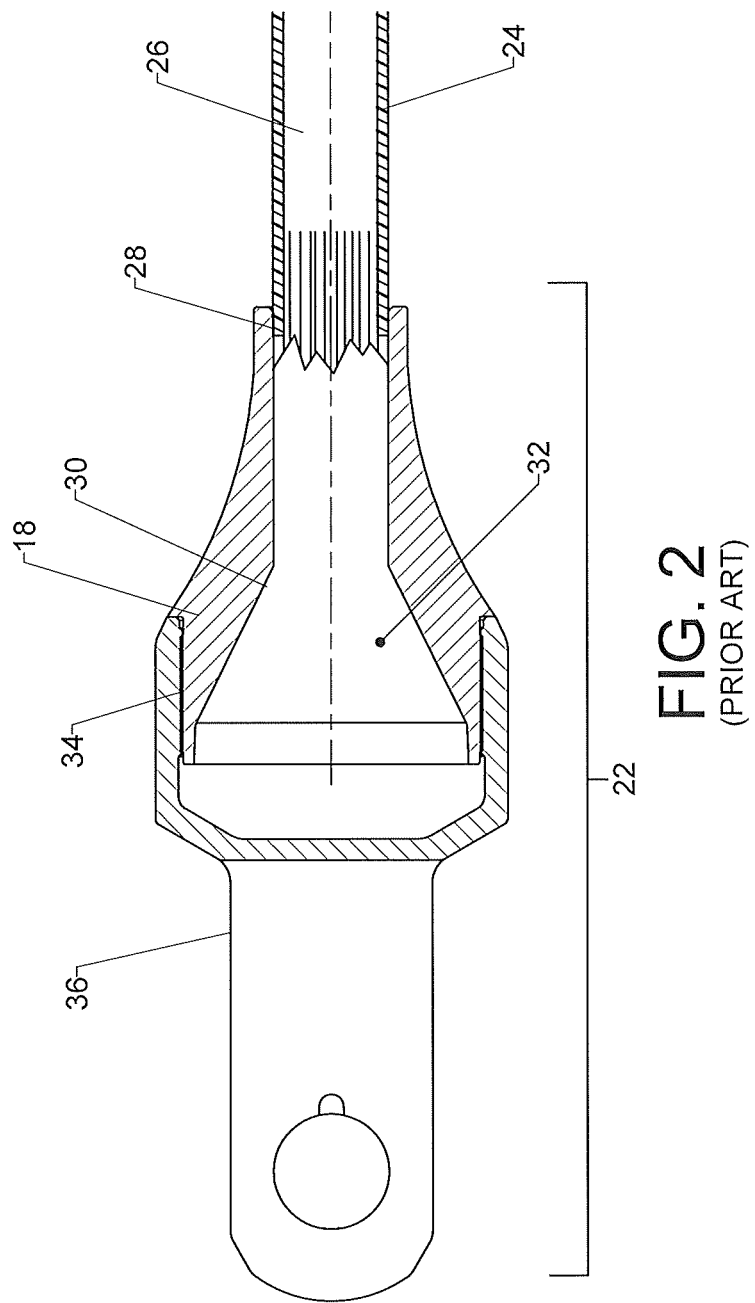
FIG. 2 is a sectional elevation view, showing the assembly of FIG. 1.

REFERENCE NUMERALS IN THE DRAWINGS 18 anchor
20 tensile member
22 termination
24 jacket
26 fibers
28 jacket receiver
30 expanding passage
32 potted region
34 threaded coupling
36 attachment fixture
38 removable cover half
40 removable cover half
42 cap screw
44 receiver
46 jacket ring
48 anchor ring
50 access hole
52 inspection region
54 anchor ring receiver
56 jacket ring receiver
58 anchor opening
60 tensile member opening
62 transparent sling
64 threaded cover
66 shoulder
68 threaded engagement
70 cover
72 access port
74 alignment marking
76 outer layer
78 inner layer
80 wound sling
82 stirrup
84 tension member
86 casement
88 cover
90 strap
92 snap
94 receiver
96 pin receiver
98 first flange
100 second flange 102 threaded boss
104 thimble
106 neck anchor portion
108 distal anchor portion
110 threaded engagement
112 cover portion
114 access port
116 hinge
118 hinge
120 latch
122 protrusion
124 cover portion
128 extension
130 fastener
131 receiver
132 clamping cover
134 body
136 flange
137 flange
138 bolt
140 threaded insert
142 rib
144 hole
146 band clamp
148 cover portion
150 panel
152 panel
153 slider joint
154 bolt
155 pawl
156 bolt
157 hinge
158 notch
160 threaded plug
162 slot
164 threaded hole
166 strand
168 termination
170 collector
172 male thread
174 female thread
176 loading fixture
178 shroud

DETAILED DESCRIPTION OF THE INVENTION

Synthetic tensile member assemblies are used in a wide variety of applications, each of which imposes differing operating constraints. The operating constraints of a particular tensile member will often determine the areas of interest for inspection. For instance, a tensile member that is carrying a relatively static tensile load with potted terminations (such as a crane boom pendant) often has the greatest stress concentration, bending fatigue, and outer layer abrasions at the point where the freely flexing fibers in the tensile member join the potted region in the anchor (the "potting interface"). The fibers will generally start to break in this location when the tensile member begins to fail. Longitudinal translation of a strand or strands is often easy to detect in this location as well—since the termination itself provides a fixed reference point. Longitudinal translation may result from creep or—in the case of a termination made by weaving a strand or strands around a load-transferring element and back on itself—strand slippage Thus, it is advisable to define an "inspection region" for such a tensile member in the vicinity of the potting interface.

On the other hand, another tensile member might pass over a pulley near its mid point. That point might then warrant inspection and it would make sense to define an "inspection region" near the tensile member's midpoint. In general, the present invention operates by:

(1) Providing a synthetic tensile member that is protected by a jacket;

(2) Providing the synthetic tensile member with at least one pre-defined load-transference point (a fixed termination) that defines a consistent and controlled point where a load is transferred from the synthetic tensile member to some external object;

(3) Defining one or more inspection regions where a user wishes to be able to examine the fibers of the tensile member (either visually or by other means); and (4) providing a removable cover that selectively covers the defined inspection region(s).

When in place, the removable cover preferably provides suitable protection for the fibers it covers. It is also desirable for the removable cover to be removable and replaceable multiple times over the useful life of the tensile member (though an individual cover may need to be replaced by a new cover). These objectives may be achieved using a wide variety of physical components. In the following paragraphs, detailed descriptions are provided for some of the invention's embodiments.

Figure 3:
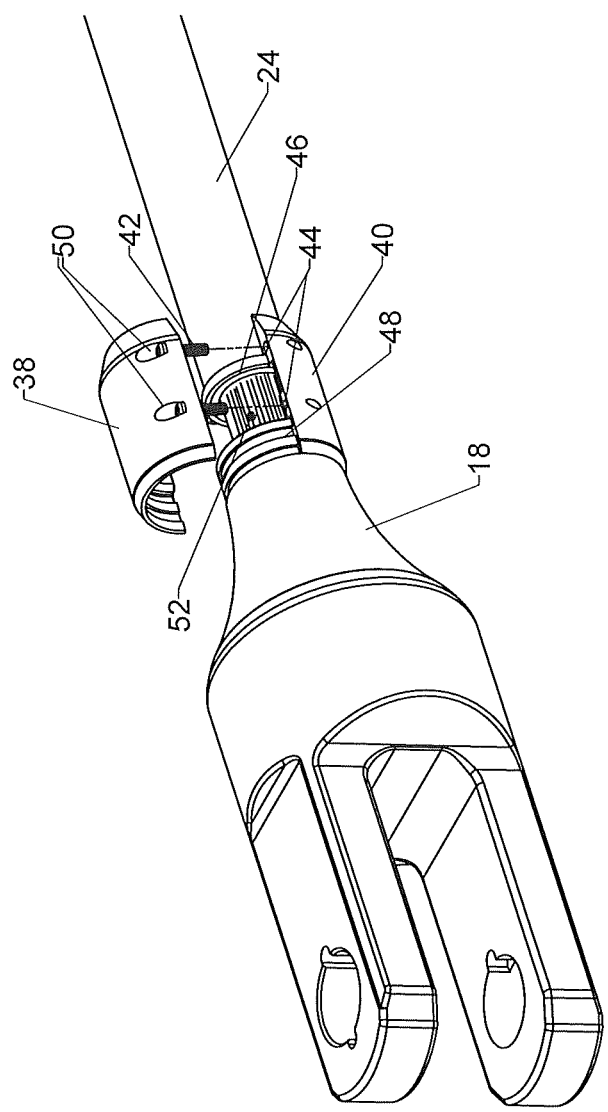
FIG. 3 is an exploded perspective view, showing an embodiment of the present invention.
Figure 4:
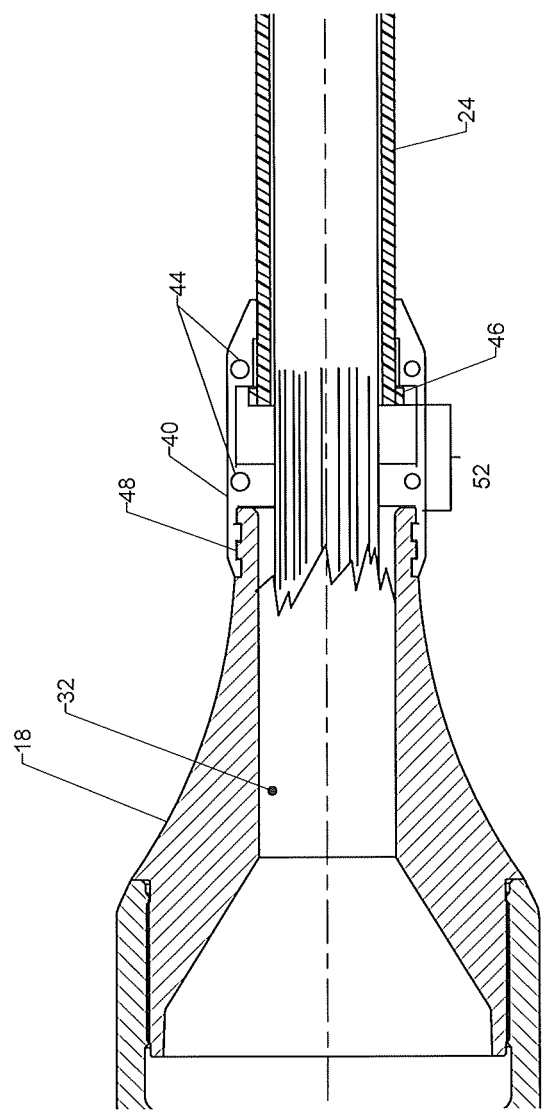
FIG. 4 is a sectional elevation view, showing the assembly of FIG. 3.
Figure 5:
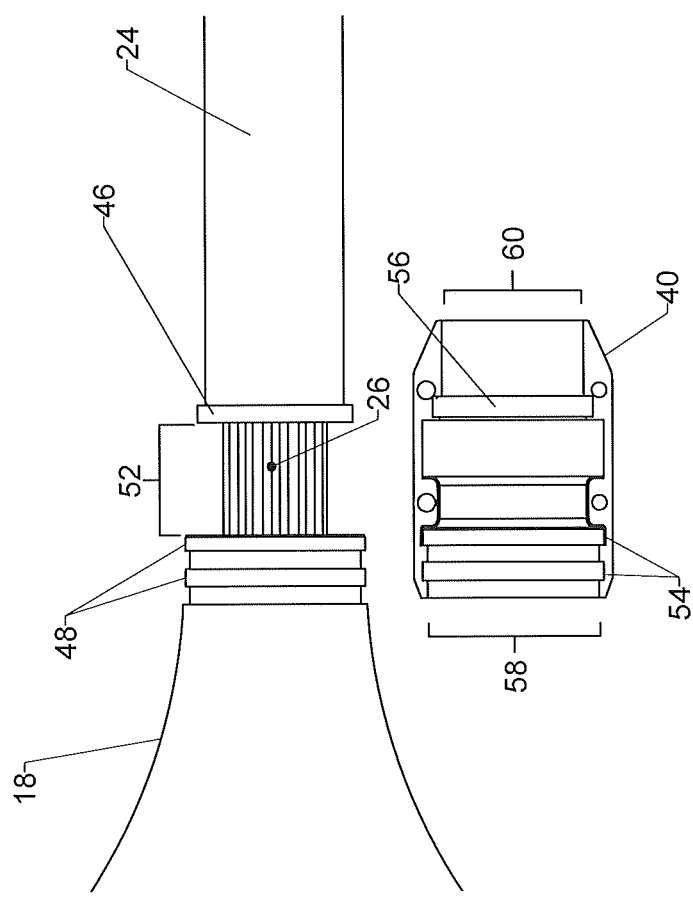
FIG. 5 is an elevation view, showing some details of the assembly of FIG. 3.

FIGS. 3-5 disclose the first embodiment of the present invention. FIG. 3 shows how jacket 24 stops short of anchor 18 in this version, leaving a length of exposed synthetic fibers therebetween. The length of exposed fibers is the "inspection region" for this embodiment. In this embodiment the removable cover is split into two halves 38, 40. These may be joined together by any suitable means. In the example shown, six cap screws are fed through access holes 50 on one of the removable halves and then threaded into threaded receivers 44 on the other half. Each access hole includes a countersunk shoulder for the head of the cap screw to bear against and draw the two halves tightly together.

It is important to protect the interior fibers from harmful exposures during use. Therefore, in this embodiment, a positive lock is provided between the cover and the jacket. This may be done using many different features, such as a long clamping surface, or a series of interlocking features. One could also include one or more sealing O-rings. One could also introduce an injected sealing compound—such as a curable silicone—before clamping the two cover halves together.

In the example of FIG. 3, anchor 18 is equipped with one or more anchor rings 48. Likewise jacket 24 may include an integral or separate jacket ring 46. The two removable cover halves include annular recesses that are sized to receive and engage the anchor rings and jacket ring.

FIG. 4 shows a sectional view through the assembly of FIG. 3 with one of the two removable cover halves still in place. Inspection region 52 in this embodiment is the annular region between the end of the jacket and the start of the anchor. For a tensile loading—especially with some flexure—the area of maximum stress concentration will often occur near the interface between potted region 32 and the freely flexing fibers within the balance of the tensile member.

Another area where inspection may be desired is the point at which the fibers exit the rigid anchor. Mild flexing will often occur at this point, producing fatigue. Thus, when the tensile member is overloaded or has experienced too much cyclic bending, the fibers in one of these regions will tend to break down before the balance of the fibers in the tensile member. Cable or strand longitudinal translation is also easy to identify in this area. Inspection region 52 allows visualization of the fibers proximate the potted region interface.

FIG. 5 is a non-sectional view showing one of the cover halves lying next to the tensile member assembly. Removable cover half 40 in this example includes:

(1) anchor opening 58 sized to admit anchor 18;
(2) anchor ring receivers 54 sized to receive and engage anchor rings 48;
(3) jacket ring receiver 56 sized to receive and engage jacket ring 46; and
(4) tensile member opening 60 sized to admit jacket 24.

Jacket ring 46 may be formed by depositing additional material over jacket 24. It may also be formed by ultrasonically deforming the end portion of the jacket to create a "bead." In still other instances the jacket ring may be a separate piece that is joined to the balance of the jacket by an adhesive or by simple friction. In some instances, however, it may be preferable to omit jacket ring 46 altogether. In that case, the interior of the removable covers may simply incorporate gripping features—such as a knurled surface or annular ring recesses—configured to "bite" into the jacket. Other gripping features may also be substituted for the interface between the removable cover half and the anchor. A connection between the cover and the jacket may also be created using a separate adhesive.

For purposes of this invention, it is only important that the jacket be held in place with a reasonable seal in order to prevent the ingress of unwanted factors based on the particular application. The unwanted factors could be UV light, chemicals, dirt, or other identified factors. The jacket, and its interface with the tension member, its interface with the termination(s), and its interface with any removable cover should be designed to provide an appropriate level of durability for the intended use.

Figure 18:
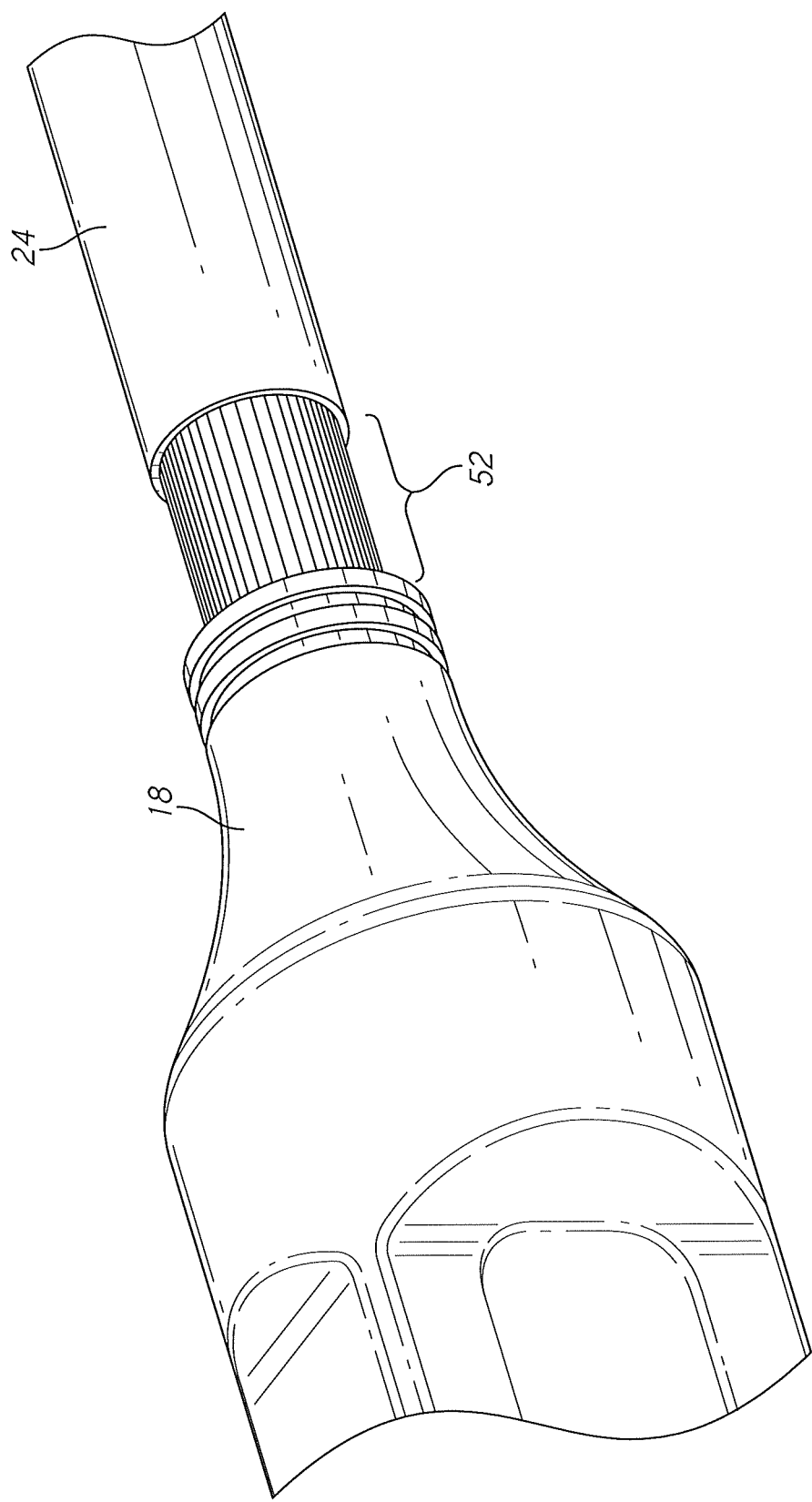
FIG. 18 is a perspective view, showing an inspection region on a cable assembly having a relatively thin jacket.
Figure 19:
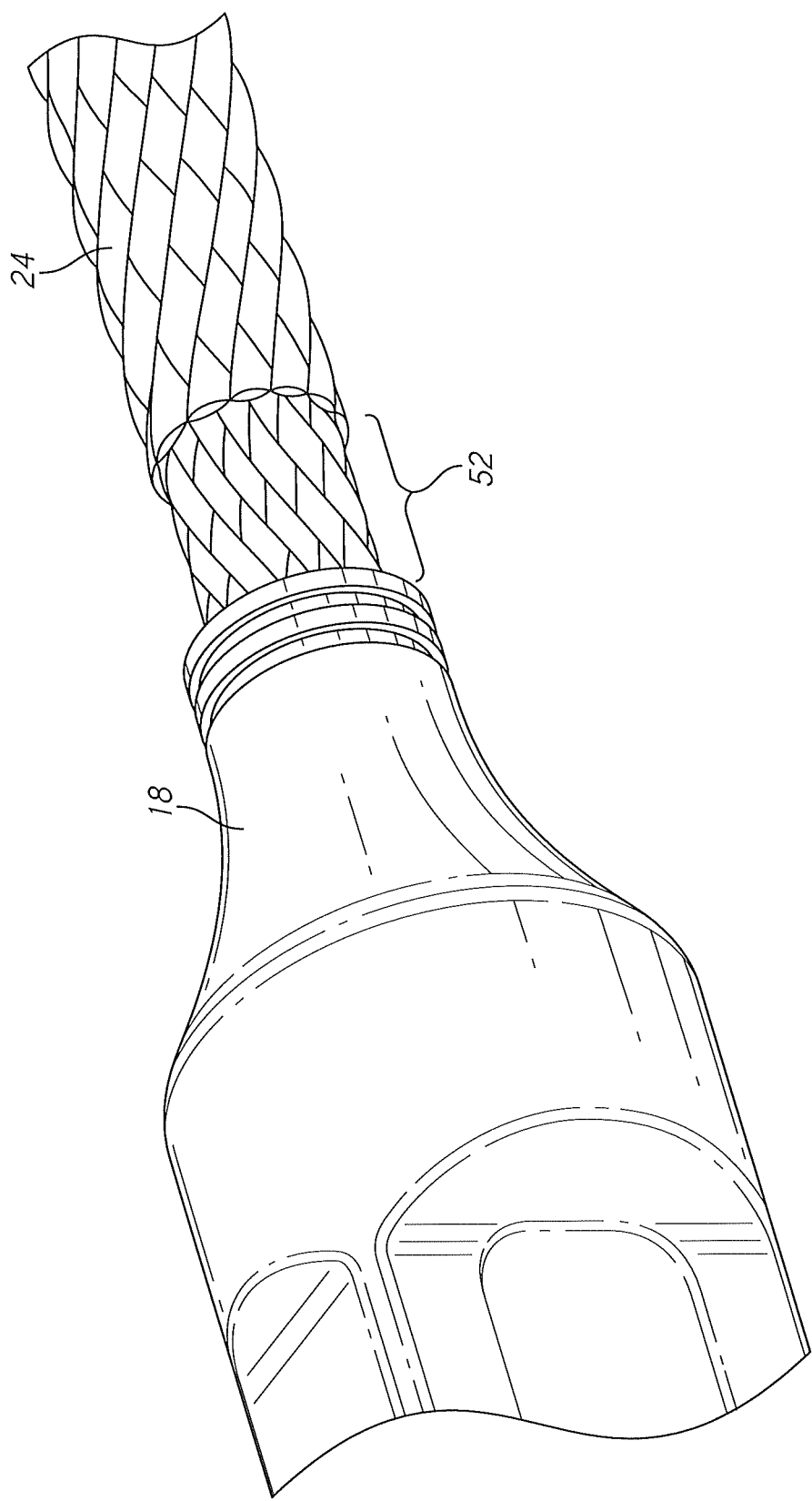
FIG. 19 is a perspective view, showing an inspection region on a cable assembly where the cable has a braided or woven jacket.

The invention is not limited to applications in which a jacket ring is present, nor is it limited to applications in which mechanical interlocking features are provided on the anchor. FIGS. 18 and 19 provide additional examples of jackets and inspection regions to which the invention can be applied. Many other possible applications exist as well.

FIG. 18 shows a version in which a thinner jacket 24 ends without any sort of ring feature. Inspection region 52 is still present. The invention can still selectively cover the inspection region and seal to the jacket and the anchor—while allowing periodic inspections by removing some or all of the cover.

FIG. 19 shows a different construction for jacket 24. In the prior examples the jacket appears as a monolithic and smooth covering—such as an extruded plastic jacket. As those skilled in the art know, many other jacket configurations are known. In the example of FIG. 19, jacket 24 is a braided or woven covering. It is made of many individual jacket fibers. FIG. 19 also serves to illustrate the fact that the strands or fibers within the inspection region 52 are often not parallel. In other examples they have been represented simplistically. FIG. 19 shows a more typical representation in which the strands or fibers within inspection region 52 are in a braided or woven configuration. The invention is applicable to a construction such as shown in FIG. 19 as well. The following sections provide descriptions of additional embodiments of the inventive cover. The reader should bear in mind that the various embodiments can be applied to differing jacket and cable constructions.

Figure 6:
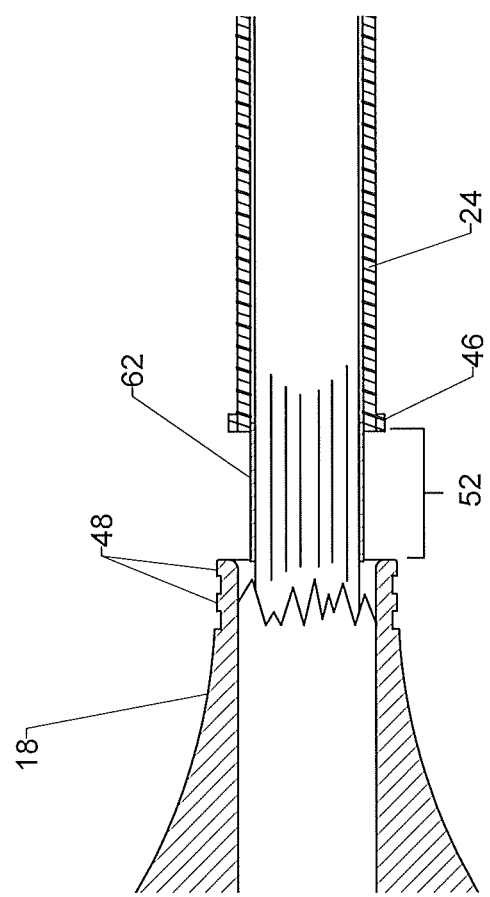
FIG. 6 is a sectional elevation view, showing an additional embodiment of the invention.

FIG. 6 shows a variation on the embodiment of FIG. 5. In FIG. 6, inspection region 52 is covered by a transparent sleeve 62. In this version, the transparent sleeve remains in position after the cover halves have been removed. However, the user is able to visually discern damaged or broken fibers or strand/cable translations through the transparent sleeve. The region of transparency may be a smaller window within a larger sleeve. The use of such a transparent region could be adopted to different portions of the anchor or jacket as well.

Figure 7:
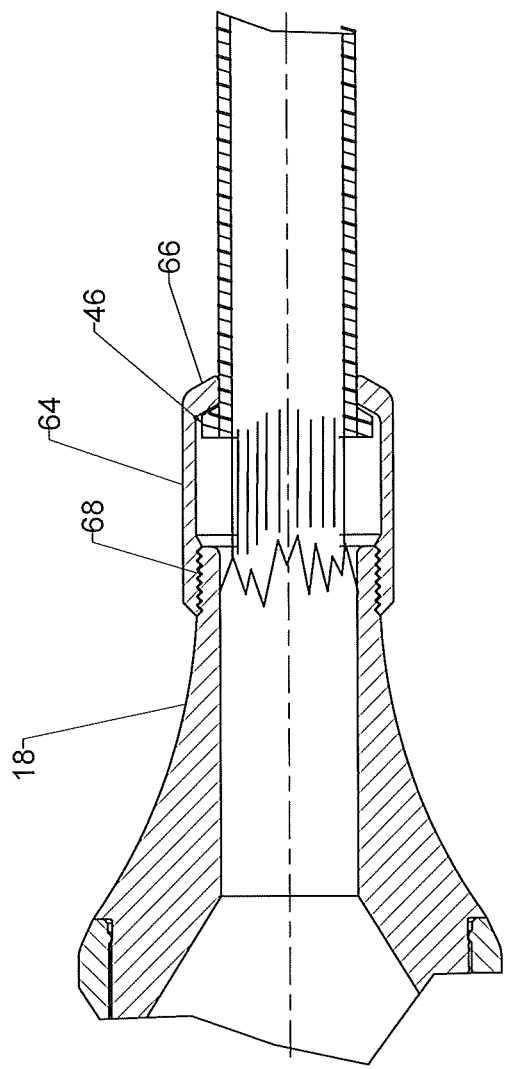
FIG. 7 is a sectional elevation view, showing still another embodiment of the present invention.
Figure 8:
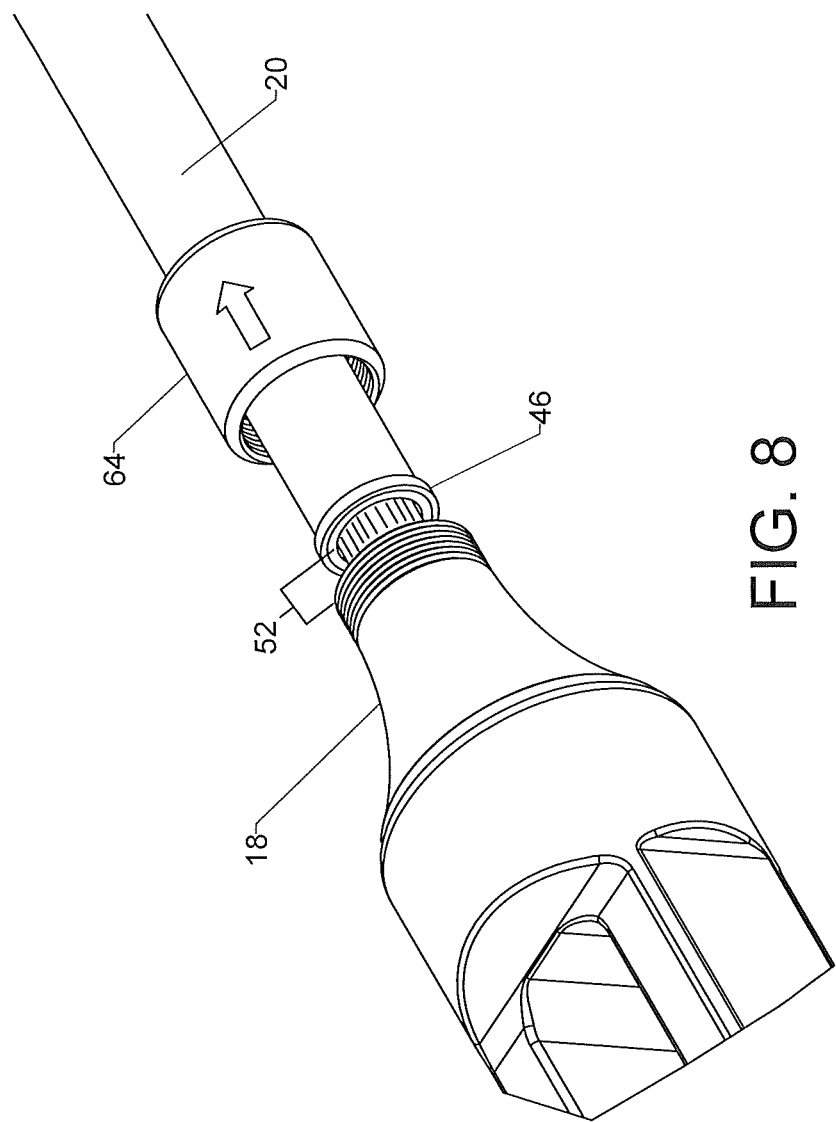
FIG. 8 is a perspective view, showing the embodiment of FIG. 7.

FIGS. 7 and 8 disclose an additional embodiment that uses a different approach to attaching and removing the cover. Threaded cover 64 is a sleeve that selectively connects to anchor 18 via threaded engagement 68. The distal end of the threaded cover includes shoulder 66, which is sized to bear against jacket ring 46. When the user wishes to inspect the inspection region, he or she grasps threaded cover 64 and unscrews it. Once the threaded engagement is released the user is able to slide the threaded cover down the jacket.

This type of cover provides good access to a useful inspection point. Stress is generally concentrated in the neck region of the anchor. This is true for a potted termination (such as shown) and also for spike-and-cone terminations, other compression devices, and nearly any other form of fixed termination. It is also useful to inspect such a transition region in the case of a spliced thimble where high stresses, abrasion, misalignment, or undesirable fiber-to-fiber, strand-to-strand, or overall cable slipping may occur.

This action is shown in FIG. 8. Threaded cover 64 is pulled down tensile member 20 in the direction indicated by the arrow. This motion reveals inspection region 52. When the inspection is complete, the user pushes the threaded cover back into engagement with the threads on anchor 18 and tightens it.

Those skilled in the art will appreciate that many other configurations for the inspection regions and covers are possible. The design of these components is dependent on the tension member construction, the location and size of the desired inspection regions, and the level of durability required to manage the unwanted elements.

Figure 9:
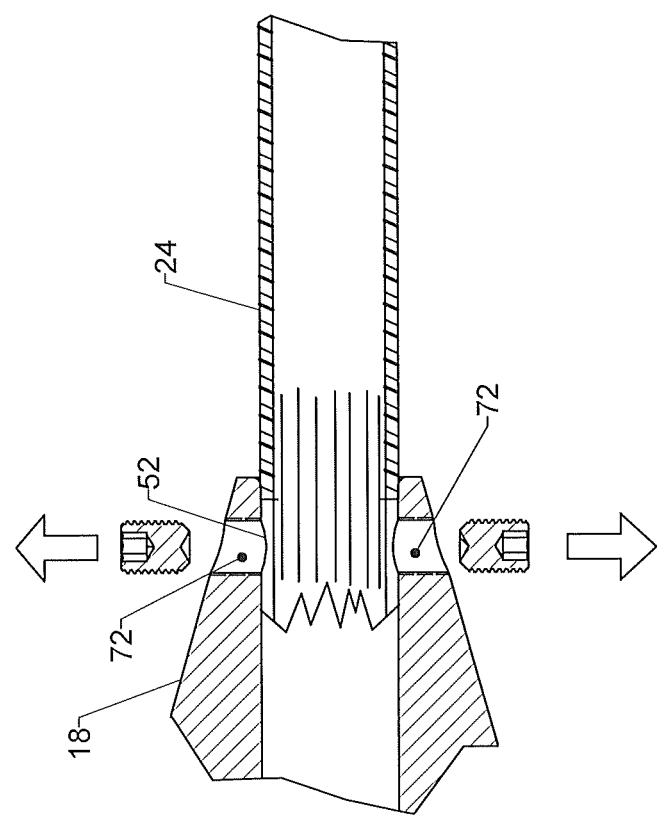
FIG. 9 is a sectional elevation view, showing still another embodiment of the present invention.

FIGS. 9-14 serve to illustrate a few of these possible additional embodiments. FIG. 9 shows an embodiment in which the inspection regions are accessed through the anchor itself. Anchor 18 is provided with one or more access ports 72. Each access port is threaded in order to receive a cover 70 (which is also threaded). When a cover 70 is removed, a user may visually inspect the synthetic fibers in inspection region 52. It is also possible to provide transparent windows in the anchor itself.

The cover in this example could even be an injected volume of curable silicone. The silicone would be injected as a liquid and then cure to form a pliable solid. The resulting flexible plug could be pried out with a screwdriver when inspection is needed. It would then be "replaced" by injecting a new volume of silicone.

Figure 16:
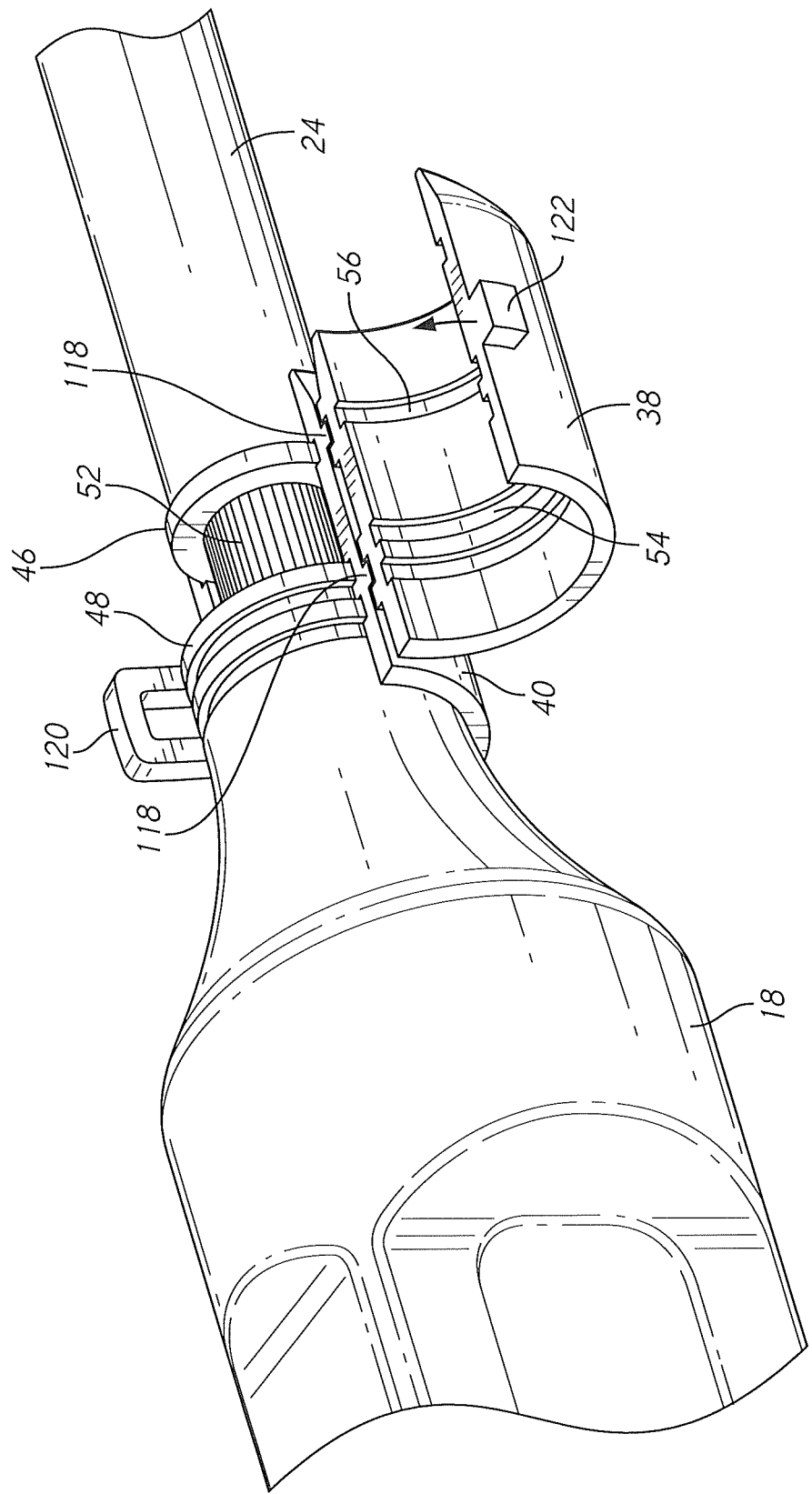
FIG. 16 is a perspective view, showing an alternate embodiment including a pivoting cover half.
Figure 17:
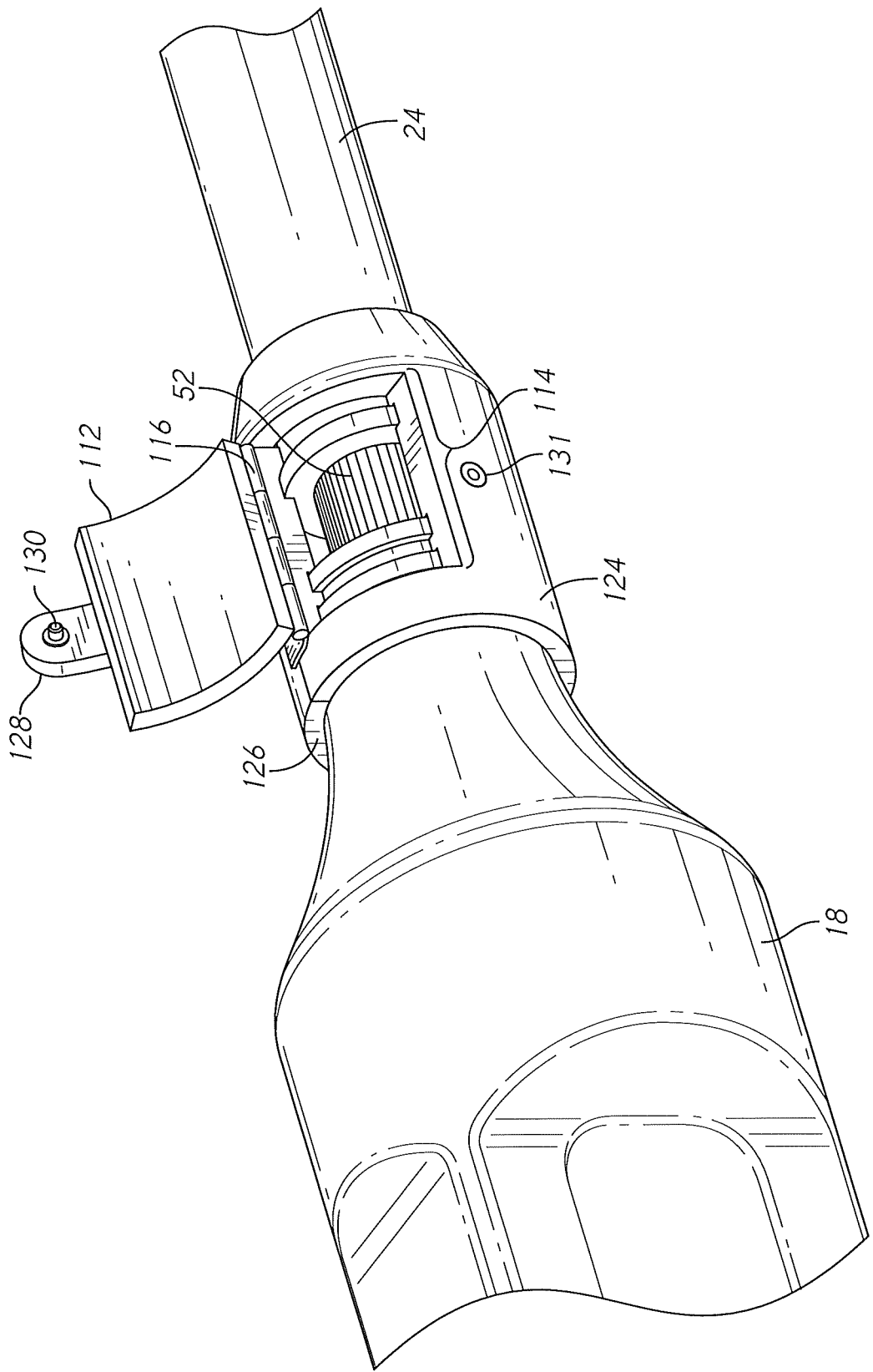
FIG. 17 is a perspective view, showing an alternate embodiment including a pivoting cover that selectively covers an access port.

As still more examples, the cover could span a large region and be removed by pivoting or sliding. The cover would be "removed" to permit access to the inspection region, yet would remain attached to the balance of the tension member. FIGS. 16 and 17 show exemplary embodiments.

FIG. 16 depicts an embodiment similar to the one illustrated in FIG. 3. Removable cover halves 38, 40 selectively cover inspection region 52. However, rather than the two cover halves being secured by cap screws 42, cover half 38 is pivotally connected to cover half 40 by hinges 118. In order to cover inspection region 52, cover half 38 is pivoted in the direction indicated by the arrow until it rests over inspection region 52.

It is of course desirable to secure cover half 38 in the closed position, and this can be done with fasteners such as the cap screws shown in the example of FIG. 3. However, in the example of FIG. 16, the pivoting cover is secured by the engagement of latch 120 with protrusion 122. Latch 120 is attached to the far side of cover half 40. The latch slips over and engages protrusion 122 on cover half 38 when cover half 38 is in the closed position. It then retains cover half 38 in the closed position until manually disengaged.

The size of the pivoting cover will of course determine how much of the covered portion of the cable can be visually inspected when the cover is opened. In some applications a smaller inspection region can be provided. FIG. 17 shows an alternate embodiment in which a pivoting cover smaller than the one provided in the embodiment of FIG. 16 is used. In this embodiment the cover is split into three sections. Cover portions 124 and 126 are attached to each other and are generally configured to remain attached to the anchor and the cable. They clamp together over a portion of anchor 18 and jacket 24 (using frictional engagement or some other methodology—such as the engagement of rings and channels as described for other embodiments). They will generally remain in place—though fasteners may be provided that make the cover portions 124,126 removable if desired.

Cover portion 124 includes access port 114, configured to lie over inspection region 52. A third portion—cover portion 112—is connected to cover portion 124 by hinge 116. The hinge allows the user to pivot cover portion 112 open as shown in order to reveal inspection region 52. Cover portion 112 remains attached by hinge 116 even when it is open.

A fastening system is preferably provided to secure pivoting cover portion 112 in the closed position. Extension 128 is provided on cover portion 112. The extension mounts threaded fastener 130. When cover 112 is pivoted to its closed position, fastener 130 threads into receiver 131 and thereby secures cover 112 in the closed position.

Figure 20:
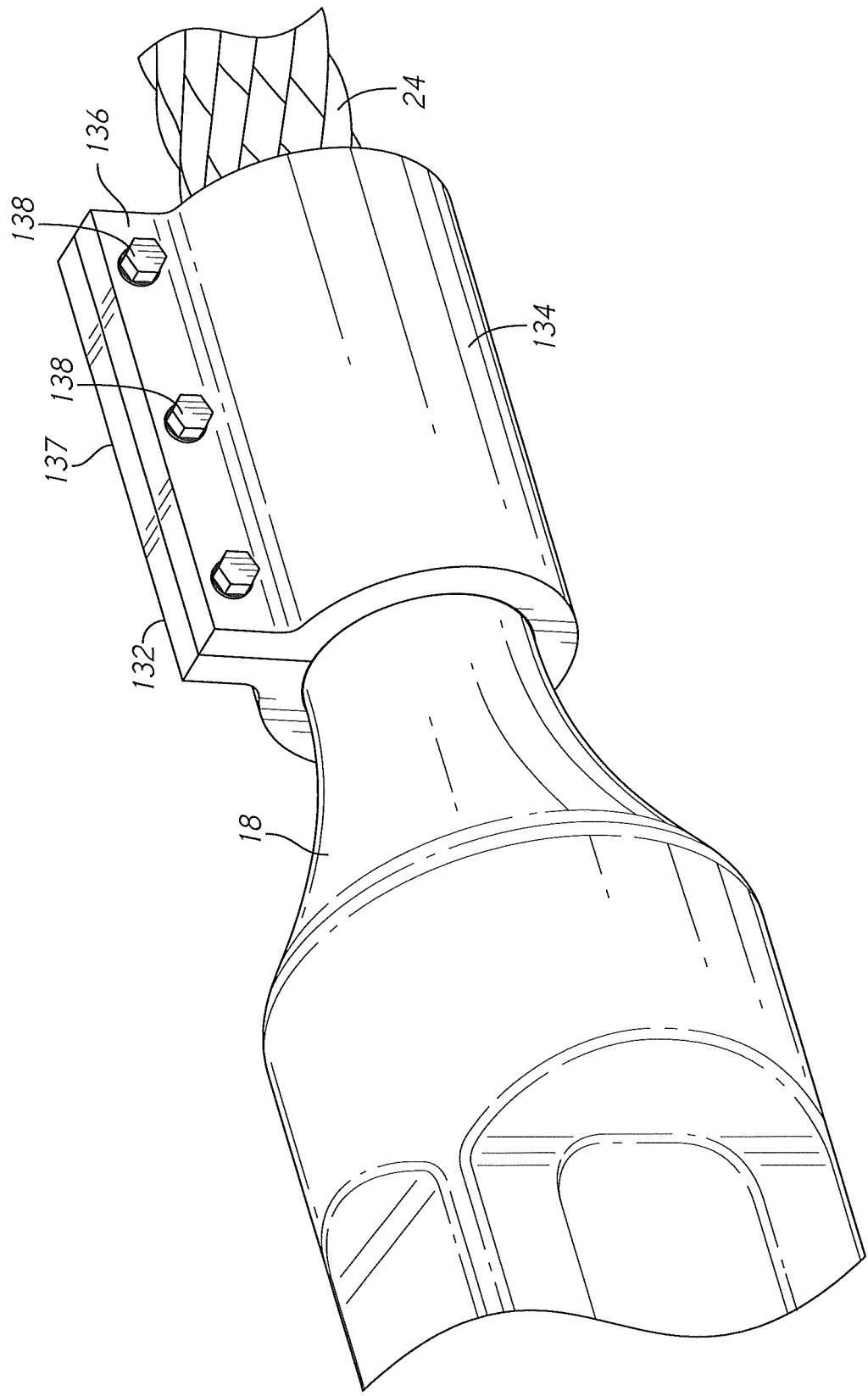
FIG. 20 is a perspective view, showing an alternate embodiment using a clamping cover.

Many other embodiments are possible for the removable cover. FIG. 20 shows a removable cover made as one piece. Clamping cover 132 includes cylindrical body 134 and integral flanges 136,137. The clamping cover is preferably molded using a flexible but tough polymer. As an example, the clamping cover may be molded using a flexible urethane. The clamping cover can be manually expanded to slip over the inspection region (as well as portions of anchor 18 and jacket 24). The clamping cover is then clamped in position by tightening three bolts 138 through flanges 137,138.

Figure 21:
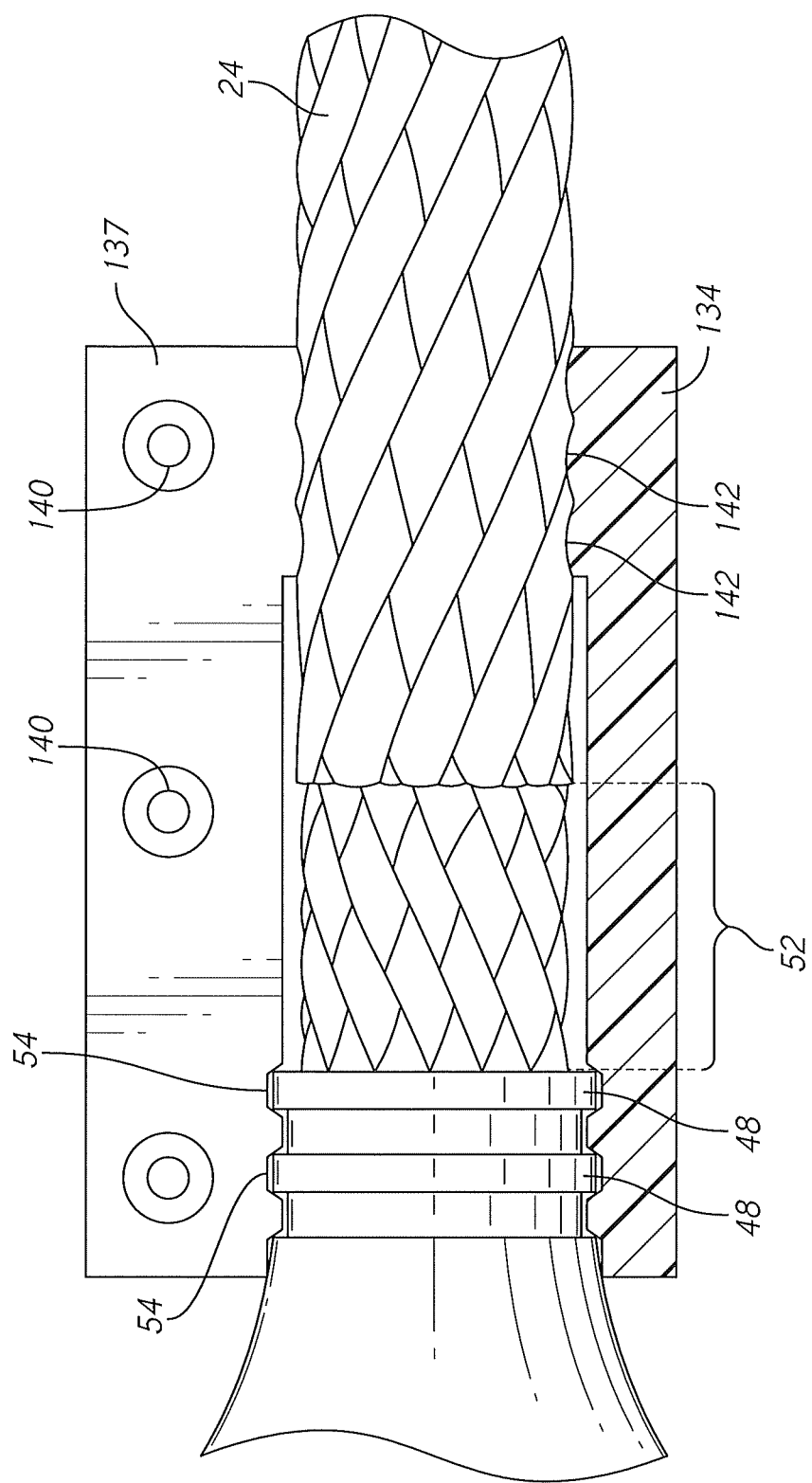
FIG. 21 is a sectional view, showing the embodiment of FIG. 20.

FIG. 21 shows a sectional view through the clamping cover in an installed configuration. The section plane runs through the mating joint between the two flanges. Thus, flange 137 is shown without any section lines. The clamping cover includes two anchor ring receivers 54 configured to engage anchor rings 48. The clamping cover also includes a series of ribs 142 configured to frictionally engage braided jacket 24. For cases where the anchor includes no anchor rings 48, simple ribs or other suitable features can be provided that frictionally engage the smooth exterior surface of the anchor neck as well. Flexible urethane does not provide adequate thread strength for the securing bolts 138. Thus, threaded inserts 140 are molded into the urethane. These are metal inserts with an internal threaded passage.

The reader will note that inspection region 52 is adequately covered by the clamping cover. In addition, a positive seal is provided between the clamping cover and the anchor and between the clamping cover and the jacket. However, it is still a simple matter to remove the clamping cover when inspection of the inspection region is desired. Returning to FIG. 20, the user loosens suitable fasteners (such as bolts) 138 so that the flanges 136,137 can be urged apart (The fasteners can be removed altogether if desired).

Figure 22:
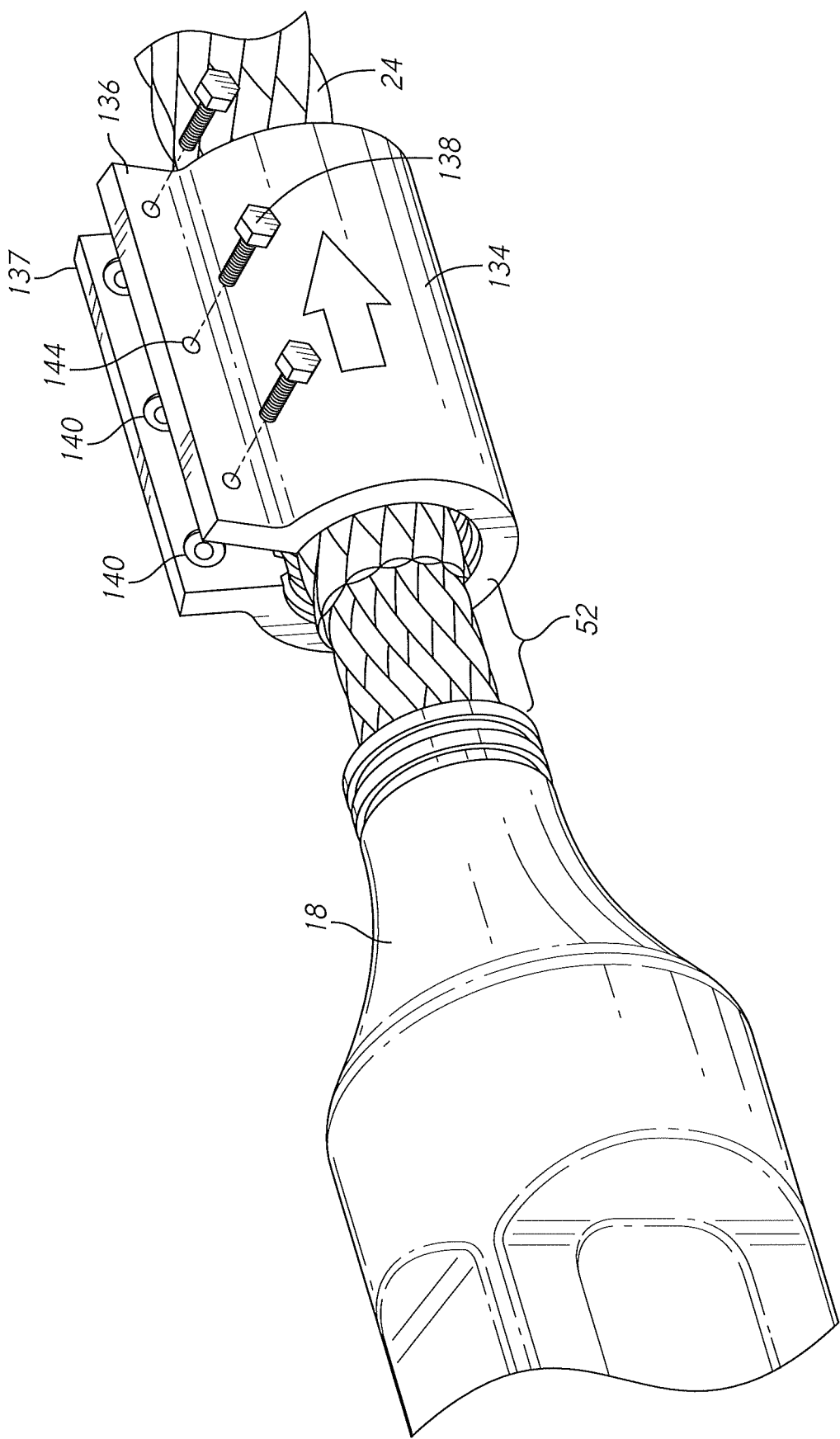
FIG. 22 is a perspective view, showing the embodiment of FIG. 20 in a position allowing the inspection region to be viewed.

FIG. 22 shows the clamping cover after the flanges have been urged apart. The diameter of the internal passage through the clamping cover is enlarged by urging the flanges apart and the cover is then free to slide down the cable as shown by the arrow. Inspection region 52 is thus revealed. Replacing the clamping cover is done by urging the flanges 136,137 apart and sliding the clamping cover back over the inspection region. Bolts 138 are passed through holes 144 and threaded into inserts 140. The bolts are then tightened to secure the clamping cover in position. While a threaded fastener has been used in this illustrative embodiment, those skilled in the art will know that many other types of fasteners could be substituted.

Figure 23:
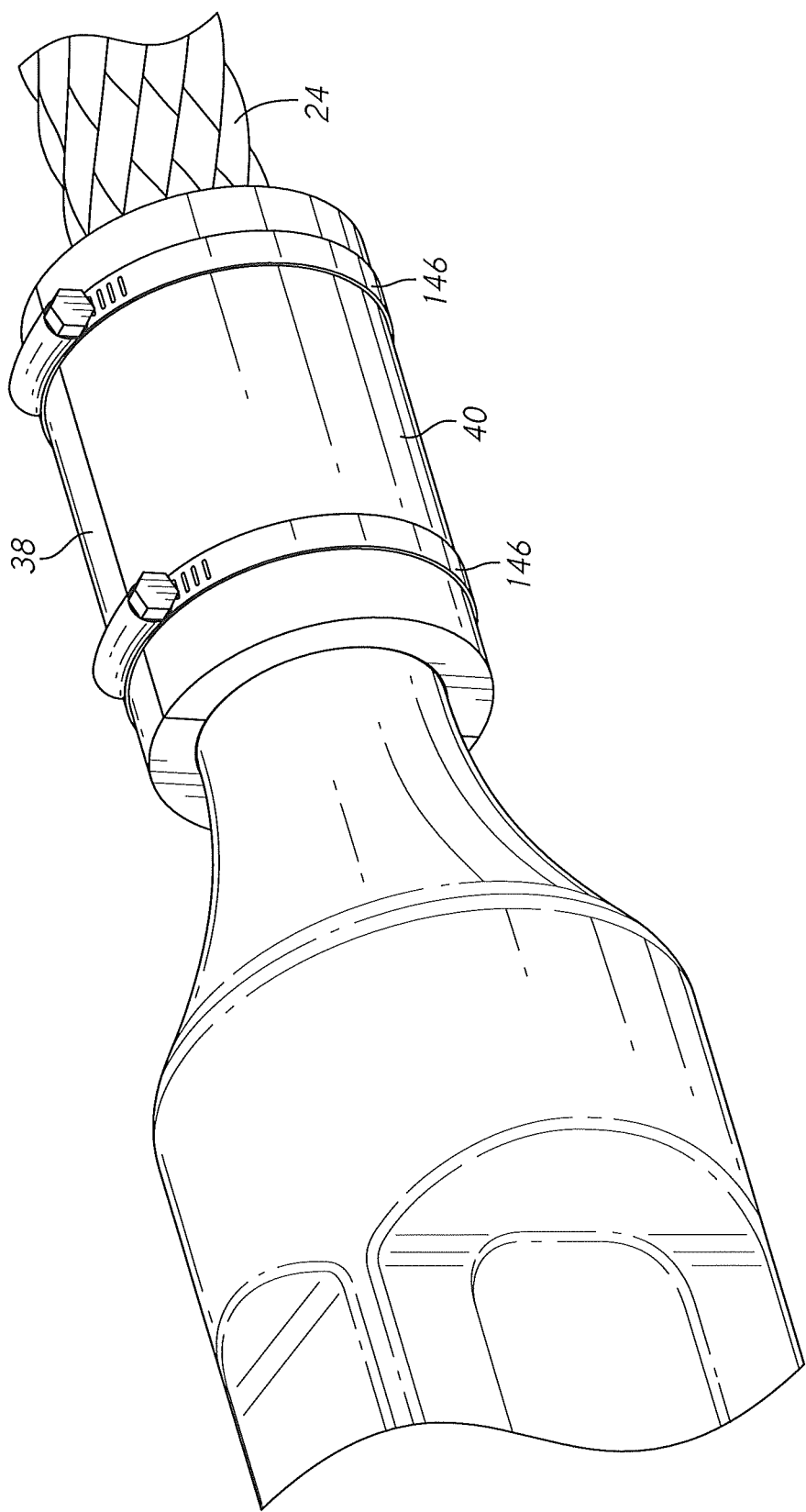
FIG. 23 is a perspective view, showing still another embodiment.

FIG. 23 shows another embodiment in which two separate cover halves 38,40 are used. These cover halves can be made of a flexible urethane as for the prior example, or of an entirely different material. The cover halves can also include the same ribs and receivers as internal features. The two cover halves are placed around the inspection region during installation. One or more band clamps 146 are passed around the two cover halves and tightened to secure them in place. Interlocking notches, tabs, or other features can be provided where the two halves mate—in order to ensure proper alignment.

In order to inspect the inspection region, the one or more band clamps are loosened, and one (or possibly both) cover halves are removed. Following the inspection, the cover halves are resecured.

The embodiment of FIG. 17 depicted an access port over the inspection region that was selectively exposed by removing a cover portion. In the version of FIG. 17, cover portion 112 was attached by a hinge running parallel to the cable's central axis. Many other methods can be used to attach the removable cover portion. FIGS. 24-27 depict some of these.

Figure 24:
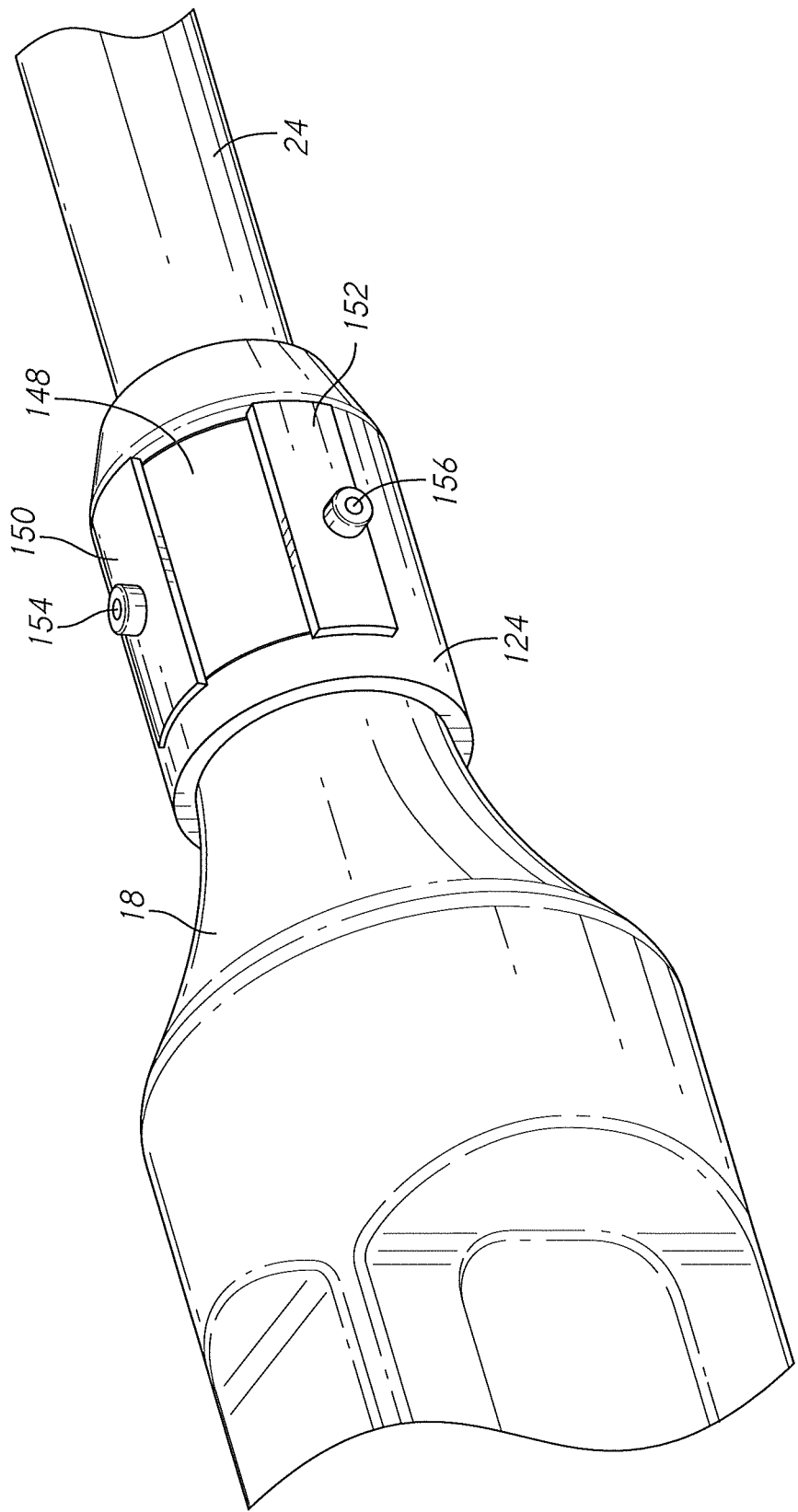
FIG. 24 is a perspective view, showing an embodiment having a cover portion that bolts in place.

In the embodiment of FIG. 24, cover portion 148 fits snugly within an access port in cover portion 124. Panels 150,152 extend from two lateral sides of cover portion 148. These panels each have a though-hole. Fasteners—such as bolts 154,156 are passed through the holes in the panels 150,152 and threaded into receivers within cover portion 124. In order to remove cover portion 148 when inspection of the inspection region is desired, the user removes the bolts 154,156 and pull cover portion 148 and attached panels 150,152 free.

Figure 25:
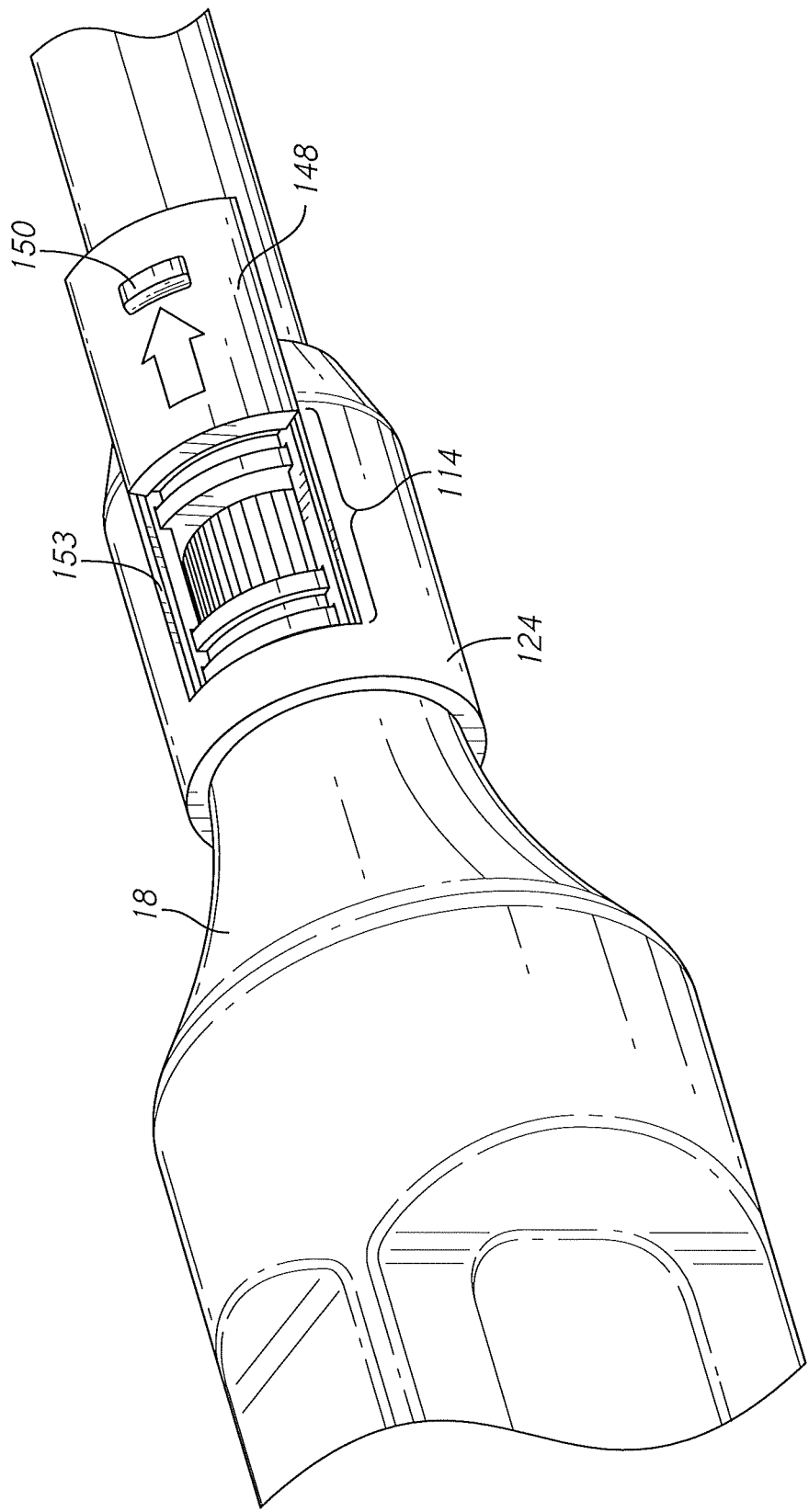
FIG. 25 is a perspective view, showing an embodiment with a sliding cover portion.

FIG. 25 shows a sliding version. Cover portion 148 is slidably connected to cover portion 124. A slider joint 153 is provided along the longitudinal sides of access port 114. Tab 150 is preferably provided. When inspection is desired, the user urges cover portion 148 in the direction indicated by the arrow. When the inspection is complete, the user slides cover portion 148 closed again. A snap feature can be used to retain the cover portion 149 in the closed position. A securing bolt or other feature could also be used.

Figure 26:
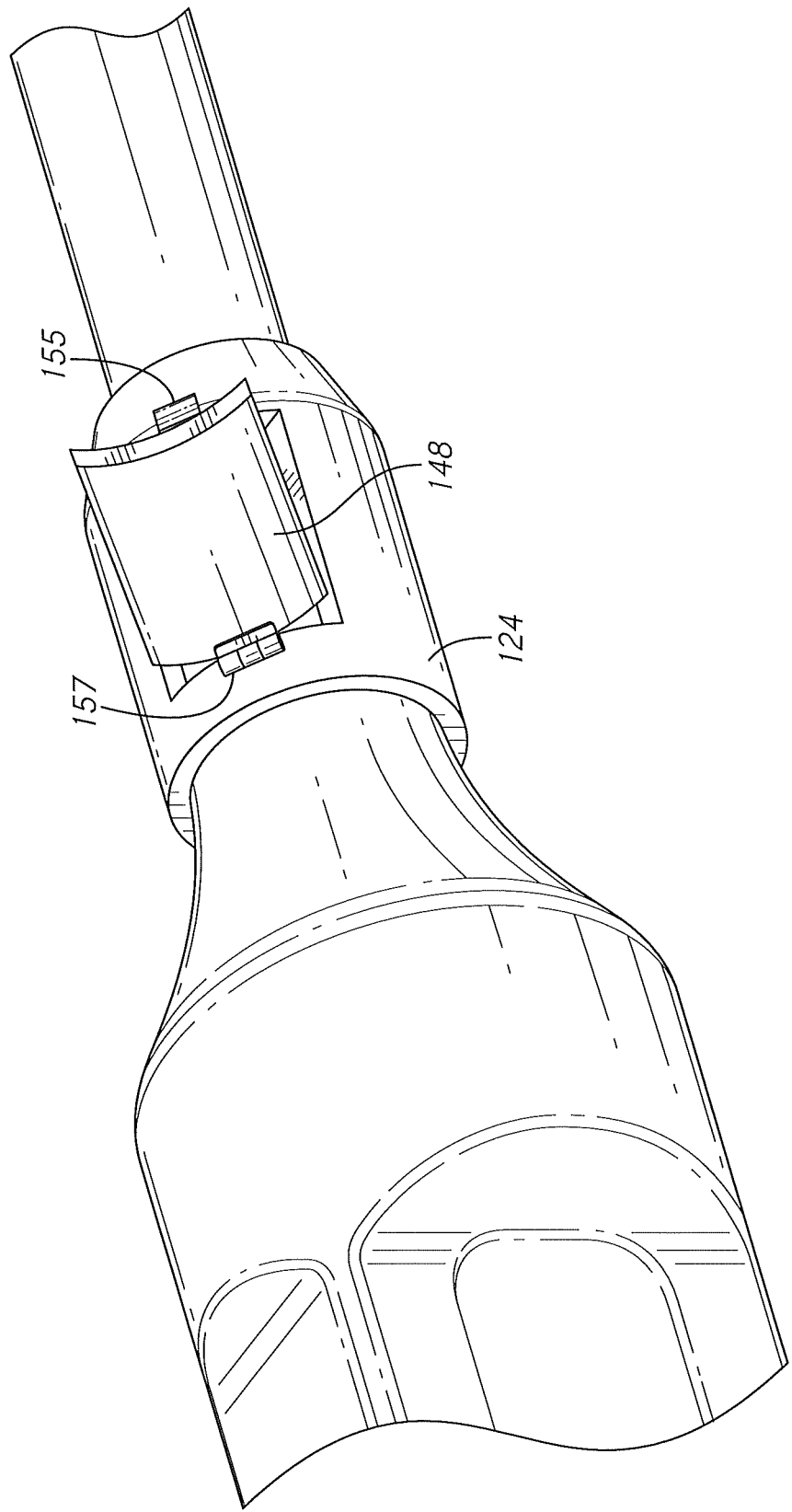
FIG. 26 is a perspective view, showing an embodiment with a pivoting cover portion.

FIG. 26 shows an embodiment in which cover portion 148 is again hinged to cover portion 124. In this version, however, hinge 157 is located on the side of the access port nearest anchor 18. Pawl 155 is a flexible feature that snaps into cover portion 124 when cover portion 148 is pressed into the closed position.

Figure 27:
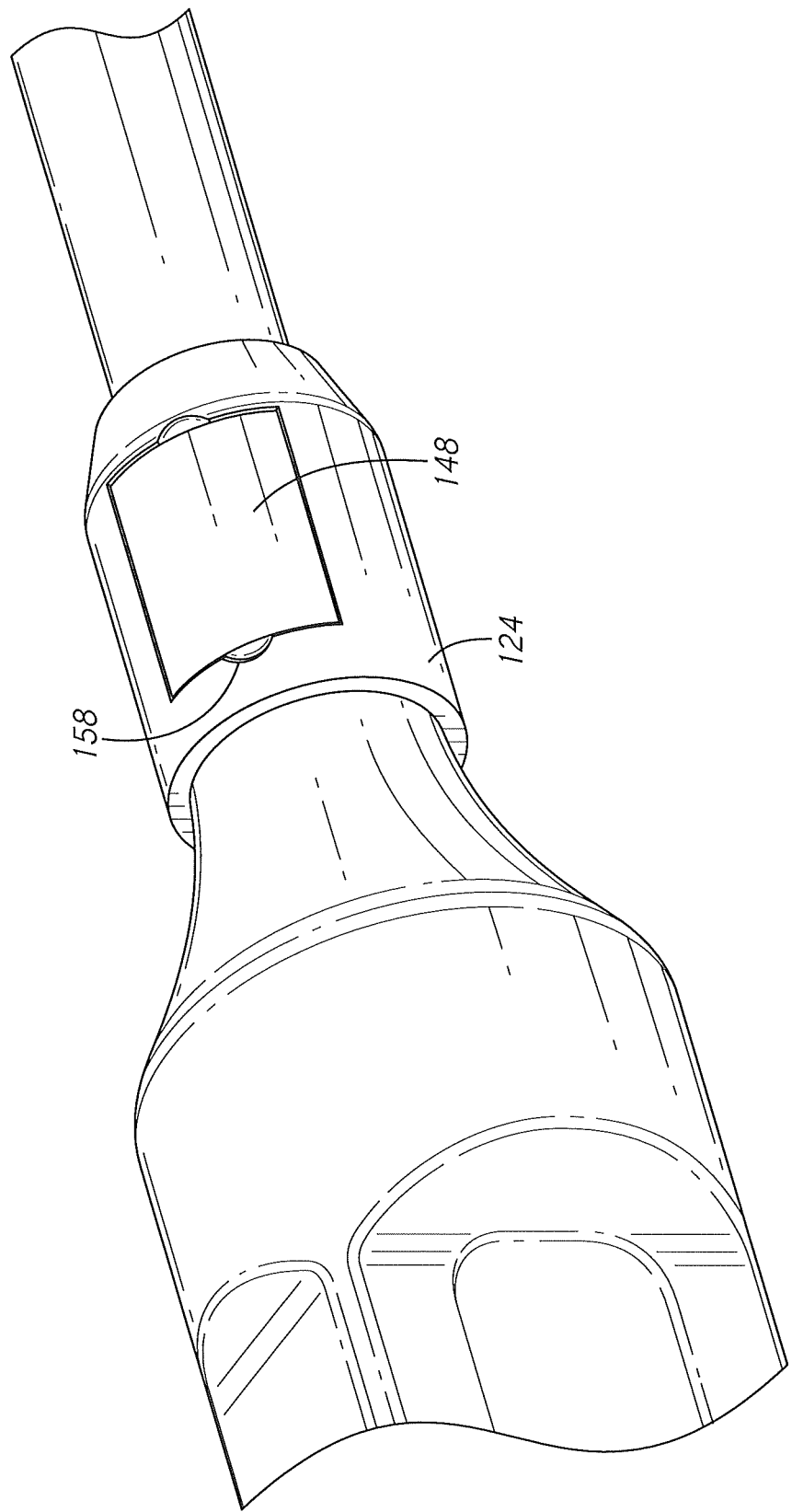
FIG. 27 is a perspective view, showing an embodiment with a press-fit cover portion.

FIG. 27 shows an embodiment in which cover portion 148 is simply a press fit within the access port. This version works well for compressible materials which have reasonably high surface friction (such as natural rubber or comparable synthetics). Notch 158 is provided so that the user can insert a finger or implement and use it to pry out cover portion 148.

Figure 28:
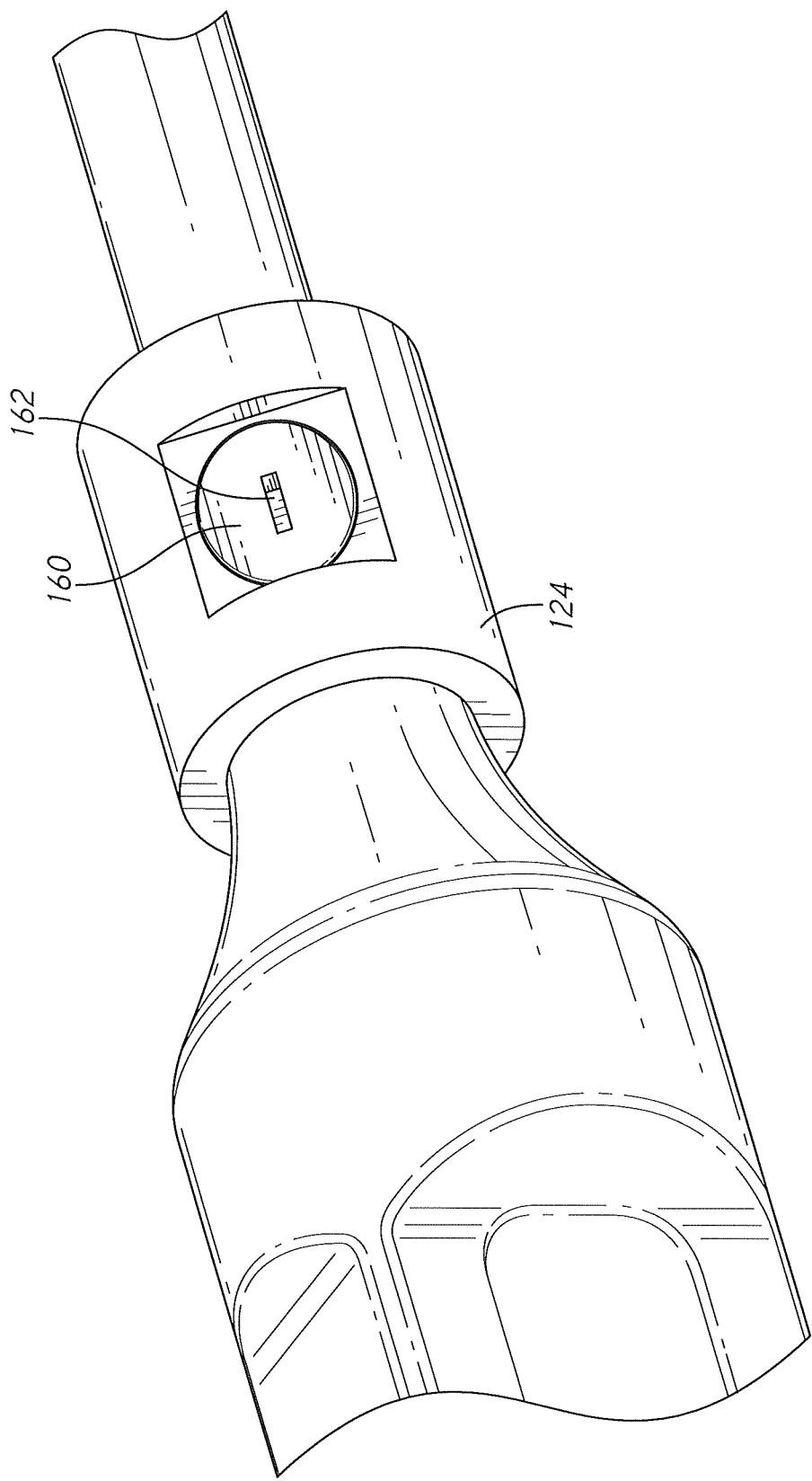
FIG. 28 is a perspective view, showing an embodiment with a threaded plug cover portion.
Figure 29:
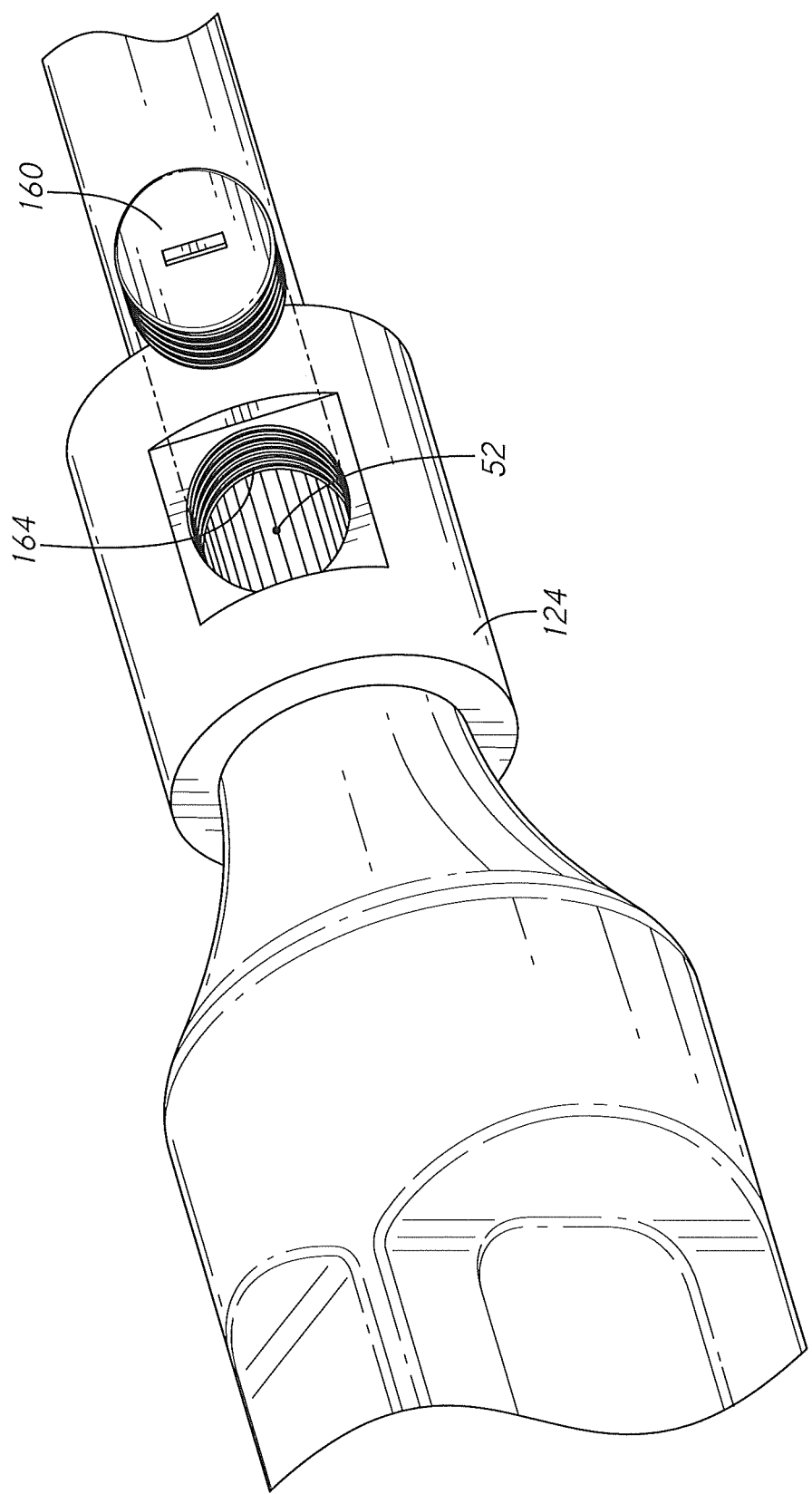
FIG. 29 is an exploded view, showing the embodiment of FIG. 28.

FIGS. 28 and 29 show an embodiment with a different type of removable cover—a threaded plug. FIG. 28 shows threaded plug 160 threaded into cover portion 124—thereby covering the inspection region. Slot 162 is provided so that a screwdriver tip (or other implement) can be used to engage and unscrew the threaded plug.

FIG. 29 shows the same embodiment after threaded plug 160 has been removed from threaded hole 164 in cover portion 124. Inspection region 52 is visible through the threaded hole. When the inspection is completed, the user replaces threaded plug 160.

In most every embodiment the reader should bear in mind that—following the desired inspection—the removable cover can be replaced with a cover of the same or similar type that is not the exact same part. In the embodiment of FIG. 27, for example, removable cover 148 may be damaged or lost. When the inspection is complete and the access area is to be covered, the user may obtain a second example of removable cover 148 and use this to cover the opening.

In addition, some of the removable covers may be installed with sealing compounds, tapes, or adhesives. The user may have to pry these out of place in order to remove the removable cover. While it might be possible to clean and reuse the cover just removed, it will often be more practical to replace it with a new cover. This is particularly true where the cover is made of some type of molded polymer, but it can be true for other examples as well.

Figure 10:
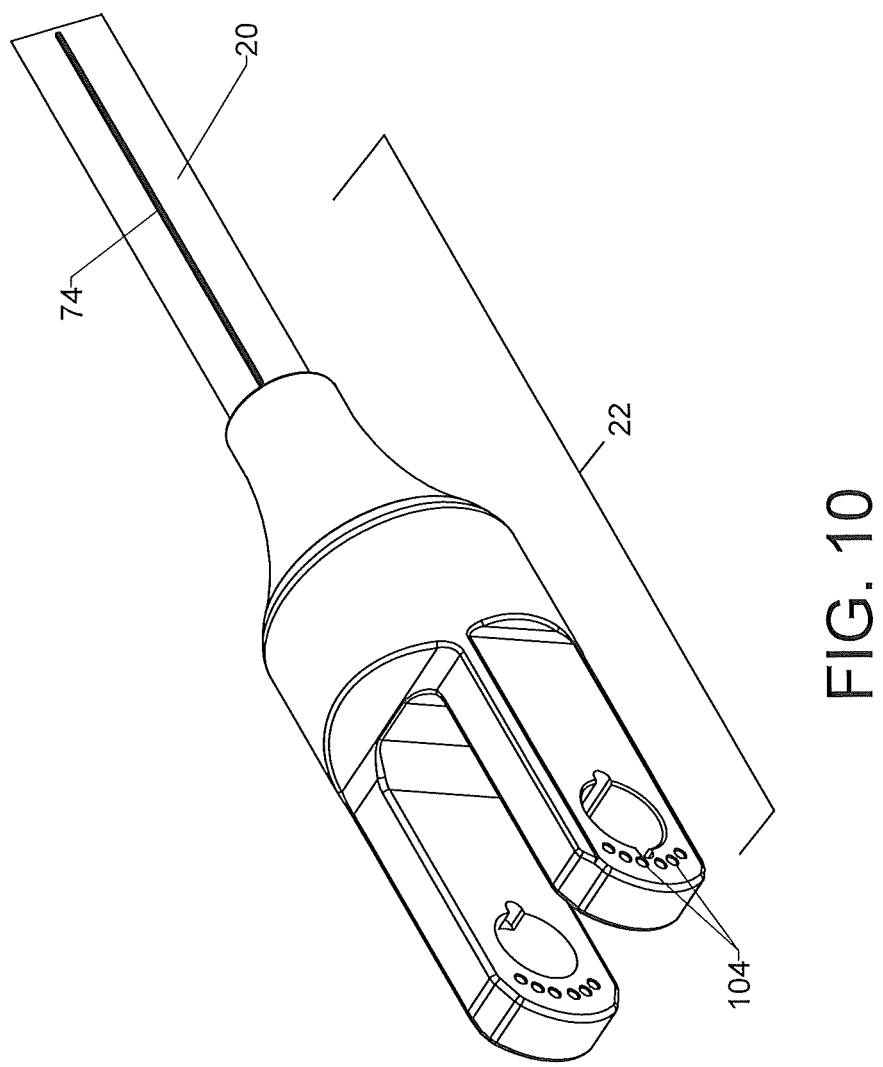
FIG. 10 is a perspective view, showing the use of a alignment marking on a tensile member jacket.
Figure 11:
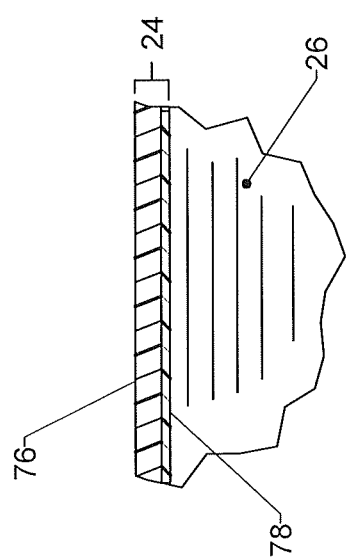
FIG. 11 is a sectional detailed view, showing the use of a jacket having layers with differing colors.

It is preferable to combine other stress-indicating features with the provision of the covered and protected inspection region. FIGS. 10 and 11 illustrate some of these features. FIG. 10 shows a termination 22 that incorporates a clevis joint configured to receive a pin through a transverse hole. Several overload holes 104 are provided in the region of the transverse hole. If a maximum specified tensile load is exceeded, overload holes 104 allow the transverse hole to elongate. This action tends to "clench" the pin that is passing through the hole. The metal will also be visibly deformed. These conditions will alert the user to the fact that the tensile member has been overloaded and should be removed from service.

Also, since the protection tensile member is covered, it may be important to control certain movements that could go unnoticed and that might adversely affect strength. In many synthetic fiber constructions, it is important to ensure that the tension member is not significantly twisted. Alignment marking 74 may be added to the tensile member jacket to show any significant twist. The alignment marking is preferably of a contrasting color—such as a yellow alignment marking on a black background. It may also be desirable to rotationally interlock the jacket and the core of synthetic fibers it contains. An extruded jacket may include a protrusion that extends inward into the core. The protrusion in the extruded profile creates a longitudinal rib that inhibits any rotation of the jacket with respect to the core. Of course, there are many possible alignment markers that could be used continuously or at certain intervals along the tensile member. Even printed text could be used for this purpose.

It is also preferable for the jacket to visually indicate a significant form of wear—such as burns, cuts, scrapes, scuffs, or a full breach. FIG. 11 shows one approach to providing such a feature. Jacket 24 includes two layers—outer layer 76 and inner layer 78. The two layers may be provided in contrasting colors (possibly using different materials). For example, the outer layer may be black while the inner layer is yellow. A scuff that is deep enough to penetrate the outer layer will thereby appear as a yellow streak on the black jacket. The outer layer may also be designed for a certain type of protection (cut resistance) while the inner layer might be designed for a different type of protection (moisture resistance).

Such a multi-layer jacket construction provides a visual "go/no-go" indication for the tensile member assembly. Separate retirement or repair criteria could then be applied to each layer of the jacket.

Figure 12:
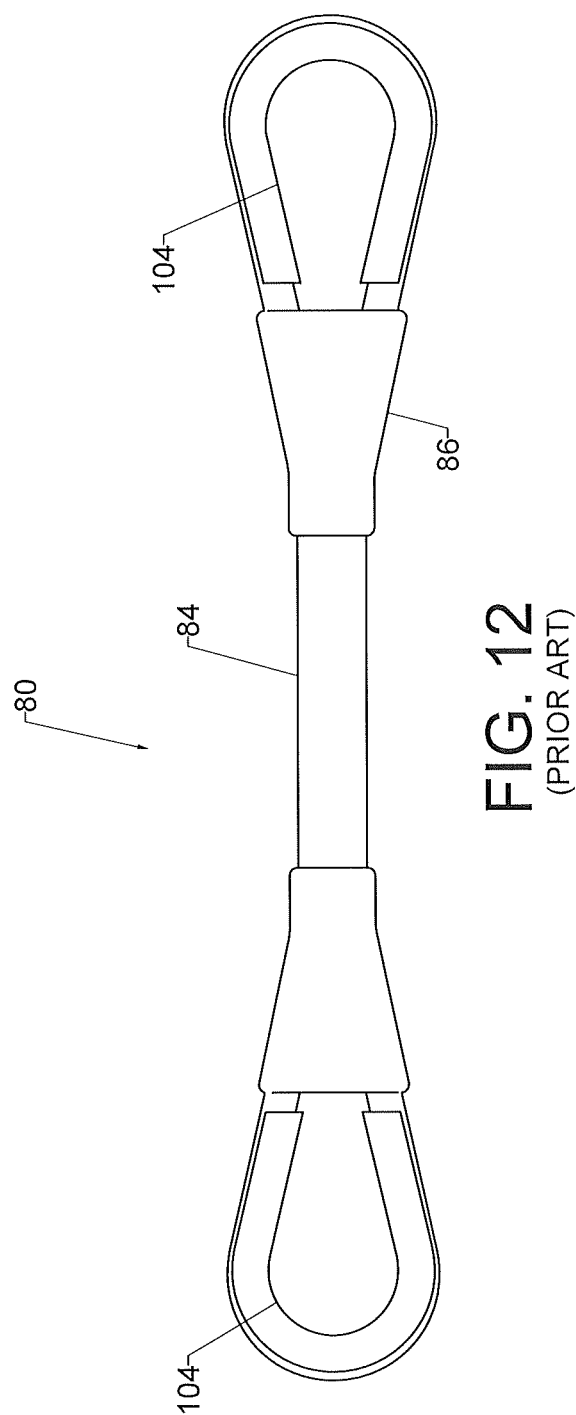
FIG. 12 is an elevation view, showing the application of the present invention to a sling device.
Figure 13:
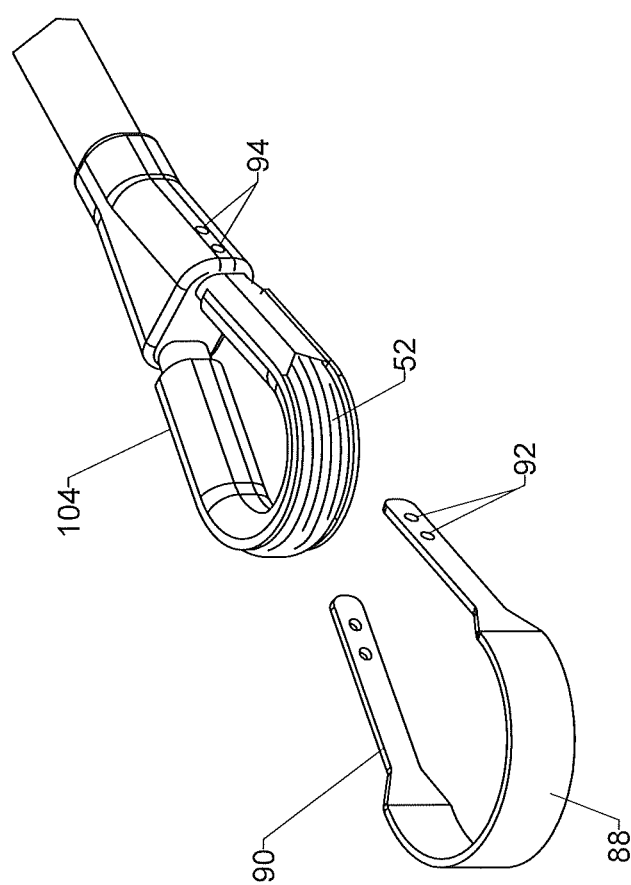
FIG. 13 is an exploded perspective view, showing an inspection region and cover for a sling device.
Figure 14:
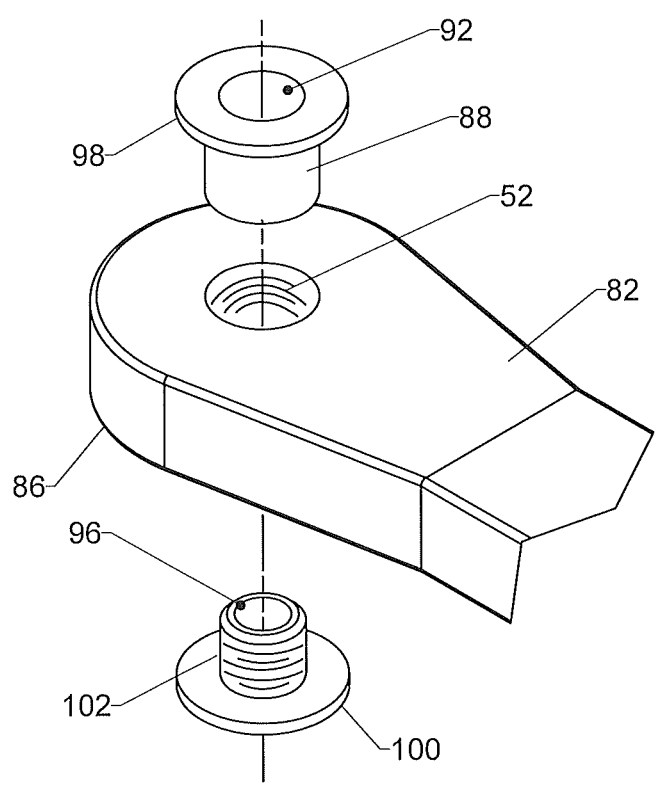
FIG. 14 is an exploded perspective view, showing an alternate embodiment of the inspection region on a sling device.

The preceding embodiments have included terminations where a length of fibers is potted into an anchor. In the field of synthetic tension member, there are of course other types of terminations and the invention is by no means limited to ropes or cables with anchor-based terminations. FIGS. 12-14 provide illustrations of the invention applied to other types of tension members and terminations.

One way to create a termination is to pass a braided rope around a stiff thimble or sheave and then weave it back into itself. A transverse pin is then passed through the thimble or sheave to convey a load. In some cases this may be configured with one tensile leg, and in other cases the synthetic fibers may wrap back around to form a "grommet" (circular configuration) with two or more tensile legs and a fixed termination at each end. In the case where grommets or round slings are used, it is important for purposes of this invention that some form of fixed termination be used. This allows the stress to be controlled and located at a defined point during the use of the tensile member.

FIG. 12 shows still another type of tensile member and termination. In this version a very long fiber or a series of twisted yarns or ropes is passed repeatedly around the two stirrups 82 until a thick bundle is produced. The entire assembly is then sealed into casement 86 (which may be a urethane or a two-part epoxy that is hardened in situ after the assembly is placed in a mold). The result is tension member 84 passing between the two stirrups 86. Such an assembly is thereby entirely sealed, with the end terminations sealed to the center region and a protective jacket covering all the fibers.

FIG. 13 shows the inclusion of an inspection region 52 on the outside portion of a stirrup 82. The inspection region is an opening in the casement that reveals the fibers inside in an area where stresses are concentrated. Cover 88 is selectively placed over the inspection region when no inspection is desired. Cover 88 is secured using strap 90. One or more snaps 92 on strap 90 snap into receiver 94. Of course, many other designs could be used to adequately cover such an arrangement.

Still another approach is shown in an exploded state in FIG. 14. In this embodiment, fibers are wound around or ropes are spliced to two-sheave-type termination bodies. In this example, a transverse hole is provided through casement 86 (The casement is the protective jacket in this case). Inspection region 52 is simply the interior of this transverse hole, where stresses are concentrated. Cover 88 is a cylindrical load-bearing element that passes through the casement and covers inspection region 52. Cover 88 includes first flange 98 that bears against a first side of the casement. Second flange 100 bears against the opposite side of the casement when threaded boss 102 is threaded into a threaded receiver in cover 88. Pin receiver 96 is a smooth cylindrical hole configured to receive a linking pin that attached the stirrup to something else. Of course, many other designs could be used to provide a cover for this type of inspection region.

It is preferable in this example to cover the inspection region with a transparent sleeve (configured to be a close sliding fit for cover 88). The presence of such a transparent sleeve allows the desired visual inspection without allowing the fibers within the inspection region to become disorganized and protrude into the cylindrical cavity needed to receive the cover.

For a spliced rope, terminated round sling, grommet, or fiber-wound sling design, inspection of these inner bearing and sliding elements would be useful. This area, like the entry point into an anchoring or termination body, is a leading stress, translation, and wear point.

Figure 15:
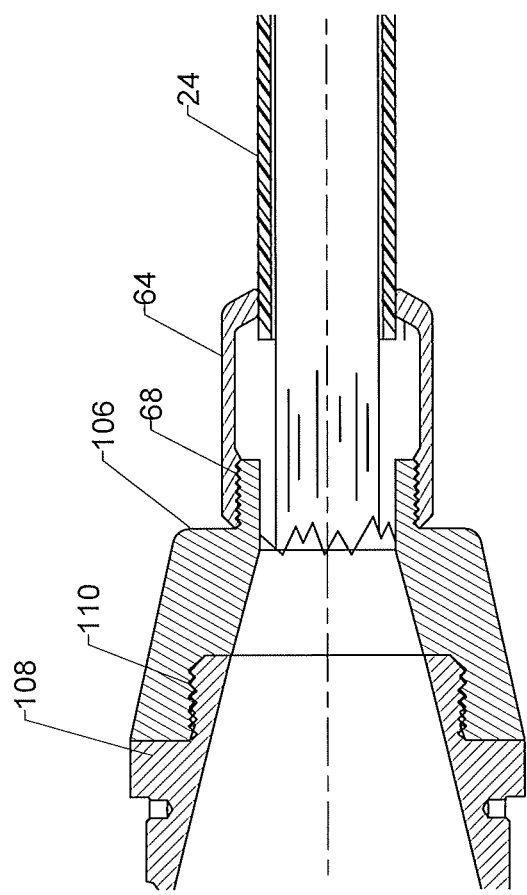
FIG. 15 is a sectional elevation view, showing a termination including two removable covers.

FIG. 15 shows an embodiment in which an enlarged inspection region is provided. In addition, this embodiment includes two separate cover pieces that provide a progressive level of access. Threaded cover 64 is similar to the configuration shown in FIG. 7. However, in this version, the anchor has been split into two pieces—neck anchor portion 106 and distal anchor portion 108. The two anchor portions are selectively engaged via threaded engagement 110.

The user may choose to unscrew threaded cover 64 and thereby gain access to the inspection region it covers. The user may then go further by unscrewing neck anchor portion 106 from distal anchor portion 108. This allows the user to extend the inspection region well into the potted region of the termination (for the case of a potted termination). In the case of a mechanical termination (such as a spike-and-cone) the extended inspection region allows the user to visualize an additional length of fibers. These transitional regions tend to carry high stress concentrations are subject to wear over use. The extended inspection region may only be used some of the time (such as to help ensure the proper initial setup of this region when it is first loaded).

Additional features and variations for the present invention include the following:

1. A version where a substantial portion of the termination or the cable jacket is transparent;
2. A version where the removable cover is a piece of tape, a helical wrapping, a wire wrapping, or a painted layer; and
3. A version where each individual termination on each individual tensile member is gathered into a larger collector of terminations (in order to build a much larger tensile member, for example).

Figure 30:
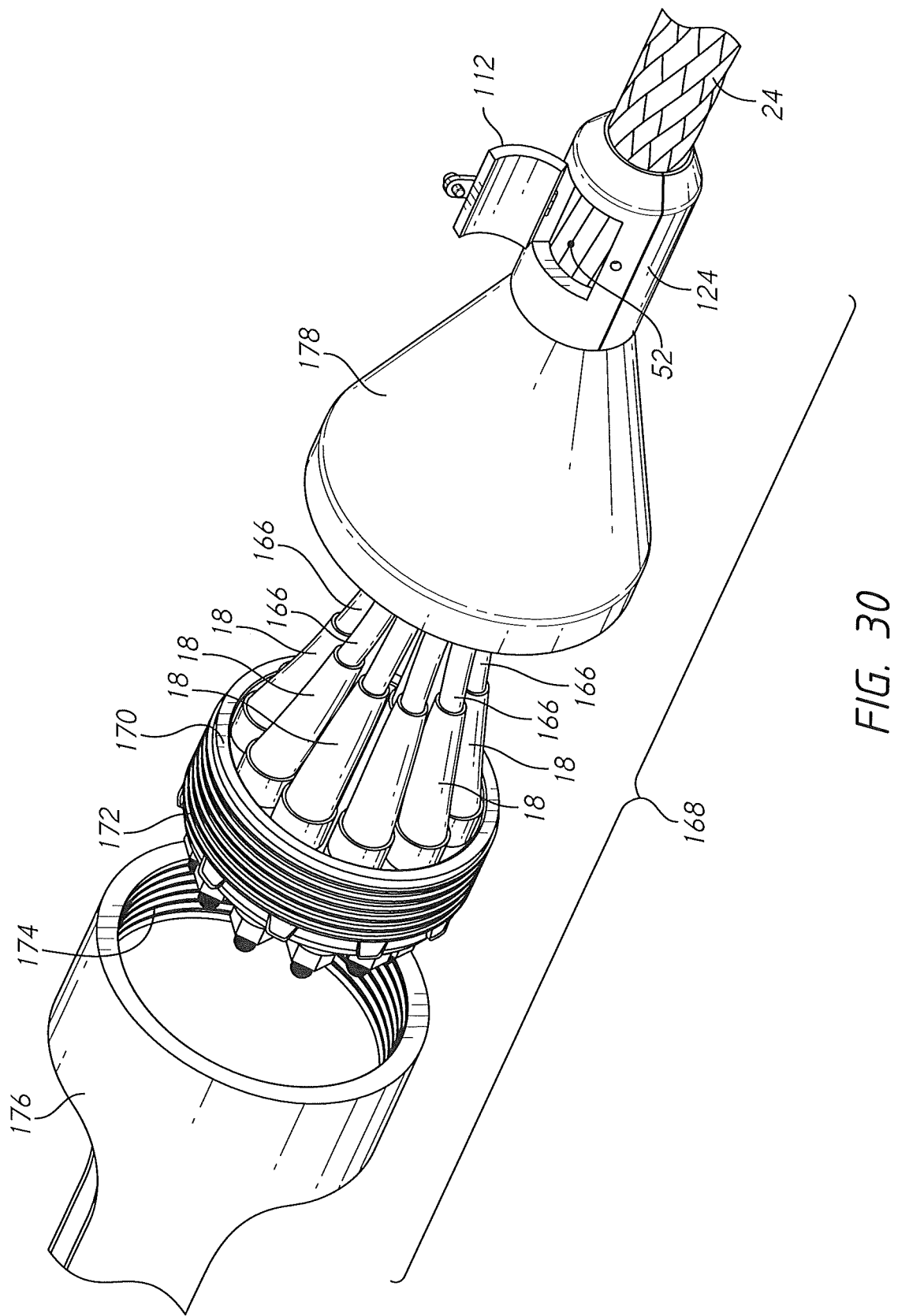
FIG. 30 is an exploded perspective view, showing the application of the invention to a termination comprising multiple strands connected to a collector.

The use of a collector to gather individual terminations on the end of each strand in a larger cable is well known to those skilled in the art. The present invention applies equally to these configurations. FIG. 30 illustrates an exemplary multi-strand collector system.

FIG. 30 presents an exploded perspective view. The cable in this case comprises multiple individual strands 166 running through jacket 24. Each strand is itself a small cable and may be a braided, woven, or other construction of millions of individual filaments. Each strand may also include its own encompassing jacket. An anchor 18 is attached to the end of each strand. Each of these anchors 18 is then attached to collector 170.

In this example collector 170 is configured to receive the entire tensile load transmitted by the cable and transmits it to an external component. A large male thread is provided on the exterior surface of collector 170. This threads into female thread 174 on loading fixture 176. The loading fixture in this case includes a large tang that is used to attach the cable to an external load-bearing element.

Shroud 178 is a hollow structure that controls the orientation and position of the strands 166 as they transition from their normal configuration within the free-running portion of the cable to the splayed configuration needed to facilitate attachment to collector 170. Shroud 178 includes a female thread on its larger end that engages male thread 172. The shroud can be screwed onto collector 170 until it abuts loading fixture 176.

Shroud 178 has a tapering neck portion that is analogous to the neck portion of anchor 18 such as in the embodiment shown in FIG. 16. An inspection region is contained just outside the neck portion of shroud 178 in the version of FIG. 30. Jacket 24 stops short of shroud 178 so that a gap exists as for the prior embodiments. This gap allows the individual strands 166 to be inspected when cover portion 112 is opened as shown in the view. The reader will observe the individual strands within inspection region 52. The overall assembly is referred to as termination 168.

Of course, the exploded position of the components in FIG. 30 is useful for visualization but does not represent how the components would actually be positioned during use. In use, shroud 178, collector 170, and loading fixture 176 are threaded together so that only the shroud and loading fixture are visible. Only when they are assembled will the gap between the end of jacket 24 and the neck portion of shroud 178 be properly positioned. Thus, cover portions 124 and 112 will not typically be put over the inspection region until the other components are assembled and the correct positional relationships are established. In use, it will not be common to disassemble the shroud, collector, and loading fixture. Only the cover portion(s) covering the inspection region will ordinarily be removed.

The example of FIG. 30 shows a removable cover such as the one depicted in FIG. 17. However, the reader should bear in mind that any of the exemplary removable covers can be combined with a collector-type termination.

Although the preceding description contains significant detail, it should not be construed as limiting the scope of the invention but rather as providing illustrations of the preferred embodiments of the invention. As an example, the removable covers could assume many different forms and could attach in different ways. Thus, the scope of the present invention should be fixed by the claims rather than the specific examples given.

The invention claimed is:

1. A method for inspecting a tensile member assembly including synthetic fibers as a tension-carrying element, comprising:
    (a) providing a tensile member, including,
        (i) a core of tension-carrying fibers, said core having an end,
        (ii) a termination attached to said end of said core,
        (iii) a jacket surrounding said core, said jacket having a jacket end lying outside of said termination, thereby leaving an inspection region between said jacket end and said termination;
    (b) providing a first cover portion configured in a first position to rest over said inspection region;
    (c) moving said first cover portion into a second position configured to provide access to said inspection region lying under said first cover portion when said first cover portion rests in said first position;
    (d) inspecting said portion of said inspection region lying under said first cover portion; and
    (e) following said inspection, returning said first cover portion to said first position.

2. The method for inspecting a tensile member assembly as recited in claim 1, further comprising:
(a) a second cover portion configured to rest over said inspection region; and
(b) wherein said first cover portion is connected to said second cover portion by a hinge.

3. The method for inspecting a tensile member assembly as recited in claim 1, further comprising a latch configured to selectively secure said first cover portion to said second cover portion.

4. The method for inspecting a tensile member assembly as recited in claim 1, further comprising:
(a) a second cover portion configured to rest over said inspection region; and
(b) wherein said first cover portion is connected to said second cover portion by a fastener.

5. The method for inspecting a tensile member assembly as recited in claim 1, further comprising:
(a) a second cover portion configured to rest over said inspection region; and
(b) wherein said first cover portion is connected to said second cover portion by a slider joint.

6. The method for inspecting a tensile member assembly as recited in claim 1, further comprising:
(a) a second cover portion configured to rest over said inspection region; and
(b) wherein said first cover portion is connected to said second cover portion by a frictional engagement.

7. The method for inspecting a tensile member assembly as recited in claim 1, wherein said step of inspecting said portion of said inspection region comprises inspecting for translation.

8. A method for inspecting a tensile member assembly including synthetic fibers as a tension-carrying element, comprising:
(a) providing a tensile member, including,
(i) a core of tension-carrying fibers, said core having an end,
(ii) a termination attached to said end of said core,
(iii) a jacket surrounding said core, said jacket having a jacket end lying outside of said termination, thereby leaving an inspection region between said jacket end and said termination;
(b) providing a cover configured in a first position to rest over a portion of said termination, said inspection region, and a portion of said jacket;
(c) moving said cover into a second position configured to provide access to said inspection region lying under said cover when said cover rests in said first position;
(d) inspecting said portion of said inspection region lying under said cover; and
(e) following said inspection, returning said cover to said first position.

9. The method for inspecting a tensile member assembly as recited in claim 8, further comprising:
(a) wherein said cover is made of a pliable material;
(b) wherein said cover is provided in the form of a band having a closable break, said break having a first side and a second side;
(c) opening said break;
(d) urging said first side of said break away from said second side of said break in order to increase a diameter of said band; and
(e) urging said cover away from said termination and over said jacket in order to expose said inspection region.

10. The method for inspecting a tensile member assembly as recited in claim 9, wherein:
(a) said first side of said break includes a first flange; and
(b) said second side of said break includes a second flange configured to mate to said first flange.

11. The method for inspecting a tensile member assembly as recited in claim 10, comprising:
(a) providing a plurality of bolts passing through said first flange into said second flange, said plurality of bolts being configured to selectively close said break; and
(b) removing said plurality of bolts in order to open said break.

12. The method for inspecting a tensile member assembly as recited in claim 9, wherein said cover includes mechanical interlocking features configured to engage corresponding features on said termination.

13. The method for inspecting a tensile member assembly as recited in claim 9, wherein said cover includes internal ribs configured to frictionally engage said jacket.

14. The method for inspecting a tensile member assembly as recited in claim 8, wherein said step of inspecting said portion of said inspection region comprises inspecting for translation.

15. A method for inspecting a tensile member assembly including synthetic fibers as a tension-carrying element, comprising:
(a) providing a tensile member, including,
a core of tension-carrying fibers, said core having an end,
(ii) a termination attached to said end of said core,
(iii) an inspection region lying proximate said termination;
(b) providing a first cover portion configured in a first position to rest over said inspection region;
(c) moving said first cover portion into a second position configured to provide access to said inspection region lying under said first cover portion when said first cover portion rests in said first position;
(d) inspecting said portion of said inspection region lying under said first cover portion; and
(e) after said inspection, covering said inspection region.

16. The method for inspecting a tensile member assembly as recited in claim 15, wherein after said inspection of said inspection region said inspection region is covered by replacing said first cover portion.

17. The method for inspecting a tensile member assembly as recited in claim 15, wherein after said inspection of said inspection region said inspection region is covered by placing a new cover portion over said inspection region.

18. The method for inspecting a tensile member assembly as recited in claim 15, further comprising:
(a) a second cover portion configured to rest over said inspection region; and
(b) wherein said first cover portion is connected to said second cover portion by a hinge.

19. The method for inspecting a tensile member assembly as recited in claim 15, further comprising a latch configured to selectively secure said first cover portion to said second cover portion.

20. The method for inspecting a tensile member assembly as recited in claim 15, wherein said step of inspecting said portion of said inspection region comprises inspecting for translation.

* * * * *